(12) United States Patent
Nomasa et al.

(10) Patent No.: US 8,313,413 B2
(45) Date of Patent: Nov. 20, 2012

(54) CONTROL DEVICE FOR HYBRID VEHICLE DRIVING DEVICE, AND CONTROL METHOD FOR THE DRIVING DEVICE

(75) Inventors: Hitoshi Nomasa, Toyota (JP); Koichi Kondo, Toyoake (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 1258 days.

(21) Appl. No.: 12/053,837

(22) Filed: Mar. 24, 2008

(65) Prior Publication Data

US 2008/0234915 A1 Sep. 25, 2008

(30) Foreign Application Priority Data

Mar. 24, 2007 (JP) ................................. 2007-078022

(51) Int. Cl.
*B60W 10/04* (2006.01)
*B60W 10/30* (2006.01)
(52) U.S. Cl. .......................................... 477/3; 903/948
(58) Field of Classification Search ....... 477/3; 903/948
See application file for complete search history.

(56) References Cited

U.S. PATENT DOCUMENTS 7,832,512 B2 * 11/2010 Watanabe et al. .......... 180/65.28
2010/0106351 A1 * 4/2010 Hanssen et al. ................. 701/22

FOREIGN PATENT DOCUMENTS

| JP | 2003-63258 A | | 3/2003 |
|---|---|---|---|
| JP | 2004-100580 | * | 4/2004 |
| JP | 2004-100580 A | | 4/2004 |
| JP | 2006-226381 A | | 8/2006 |
| JP | 2008-238837 | * | 10/2008 |

* cited by examiner

*Primary Examiner* — Sherry Estremsky
(74) *Attorney, Agent, or Firm* — Sughrue Mion, PLLC

(57) ABSTRACT

A hybrid vehicle driving device is capable of causing a motor-powered travel of a hybrid vehicle in which only an electric motor is used as a drive force source, by driving the electric motor with electric power from an electric storage device while a rotational driving of an internal combustion engine has been stopped. A control device for the hybrid vehicle driving device includes a rotational drive portion that determines whether or not supply of a lubrication oil to at least a portion of the power transmission device by the lubrication oil supply device is necessary based on a travel distance in the motor-powered travel following a stop of the rotational driving of the internal combustion engine, and rotationally drives the internal combustion engine based on determination as to need for the supply of the lubrication oil.

22 Claims, 16 Drawing Sheets

CONTROL DEVICE FOR HYBRID VEHICLE DRIVING DEVICE, AND CONTROL METHOD FOR THE DRIVING DEVICE

INCORPORATION BY REFERENCE

The disclosure of Japanese Patent Application No. 2007-078022 filed on Mar. 24, 2007, including the specification, drawings and abstract is incorporated herein by reference in its entirety.

BACKGROUND OF THE INVENTION

1. Field of Invention

The invention relates to a control device for a hybrid vehicle driving device that includes an internal combustion engine and an electric motor as drive force sources and that is capable of realizing a motor-powered travel of the hybrid vehicle in which only the electric motor is used as a drive force source during a state where the rotational driving of the internal combustion engine is stopped, and also relates to a control method for the driving device. More concretely, the invention relates to a technology of controlling the supply of lubrication oil to a power transmission device performed by a lubrication oil supply device that supplies lubrication oil due to the rotational driving of the internal combustion engine.

2. Description of Related Art

A well-known control device for a hybrid vehicle driving device includes an internal combustion engine and an electric motor as drive force sources, a power transmission device that transmits power of the drive force sources to driving wheels, an electric storage device that supplies electric power stored therein to the electric motor, and a lubrication oil supply device that is operatively linked to the internal combustion engine and supplies lubrication oil to at least a portion of the power transmission device due to the rotational driving of the internal combustion engine.

An example of this technology is a control device for a hybrid vehicle driving device described in Japanese Patent Application Publication No. 2003-63258 (JP-A-2003-63258). This control device for a hybrid vehicle driving device includes, as a power transmission device, a planetary gear device that has a first element linked to the engine, a second element linked to the first electric motor, and a third element linked to the transmission member and a second electric motor, and that distributes the output of the engine to the first electric motor and the transmission member. The control device is capable of realizing a motor-powered travel of the hybrid vehicle in which only the second electric motor is used as a drive force source during a state where the rotational driving of the engine is stopped.

Besides, this control device for a hybrid vehicle driving device includes an oil pump linked to the output shaft of the engine. Using the oil pump that is rotationally driven when the engine is operated, the control device supplies lubrication oil to various portions (e.g., gears, bearings, etc.) of the planetary gear device and other power transmission devices. However, since the oil pump linked to the output shaft of the engine is not rotationally driven during the motor-powered travel during which the rotational driving of the engine is stopped, there is a possibility that during the motor-powered travel, necessary supply of lubrication oil to various portions of the power transmission devices may fail and therefore rotating members, such as gears and the like, may undergo seizure or the like and therefore decline in durability. For example, if it may be possible to supply lubrication oil to various portions of the power transmission devices by the well-known differential ring gear or the like splashing up lubrication oil accumulated in the power transmission devices, lubrication can be accomplished, for example, on the meshing portions of tooth surfaces of gears and the like, but there is a possibility of failure of sufficient supply of lubrication oil to interiors of the planetary gear device, bearings, etc.

Therefore, Japanese Patent Application Publication No. 2003-63258 (JP-A-2003-63258) proposes that in the case where a predetermined condition is satisfied while the operation of the engine is stopped, concretely, in the case where a predetermined time (e.g., a constant time or a time determined according to the lubrication oil temperature) has elapsed after the engine stops, the engine be rotationally driven by driving the first electric motor for a predetermined time to rotationally drive the oil pump so that lubrication oil is supplied to various portions in the power transmission devices.

However, even while the predetermined time has not elapsed after the engine stops, the supply of lubrication oil to various portions in the power transmission devices becomes needed in the case where the travel distance in the motor-powered travel is long, or in the case where the travel distance is predicted to be long. On the other hand, even after the predetermined time has elapsed after the engine stops, the supply of lubrication oil to various portions in the power transmission devices is not needed in the case where the travel distance in the motor-powered travel is short, or in the case where the travel distance is predicted to be short.

Hence, if the engine is rotationally driven in a fixed fashion when a predetermined time elapses after the engine stops as in Japanese Patent Application Publication No. 2003-63258 (JP-A-2003-63258), there is a possibility of decline in the energy efficiency, for example, the fuel consumption efficiency.

Particularly in a so-called plug-in hybrid vehicle capable of charging the electric storage device from a household electric outlet or the like, the above-stated problem may become conspicuous due to its increased frequency of the motor-powered travel.

SUMMARY OF THE INVENTION

The invention provides a control device for a hybrid vehicle driving device capable of supplying lubrication oil to at least a portion of a power transmission device by rotationally driving an internal combustion engine at appropriate timing after the rotational driving of the internal combustion engine is stopped, and also provide a control method for the driving device.

A first aspect of the invention relates to a control device for a hybrid vehicle driving device. The hybrid vehicle driving device includes: an internal combustion engine and an electric motor as drive force sources; a power transmission device that transmits power of the drive force sources to a driving wheel; an electric storage device that supplies stored electric power to the electric motor; and a lubrication oil supply device that is operatively linked to the internal combustion engine and that supplies lubrication oil to at least a portion of the power transmission device due to rotational driving of the internal combustion engine. The hybrid vehicle driving device is capable of causing a motor-powered travel of a hybrid vehicle in which only the electric motor is used as a drive force source, by driving the electric motor with electric power from the electric storage device while the rotational driving of the internal combustion engine has been stopped. The control device for the hybrid vehicle driving device includes a rotational drive portion that determines whether or not supply of the lubrication oil to at least a portion of the power transmission device by the lubrication oil supply device is necessary based on a travel distance in the motor-powered travel following a stop of the rotational driving of the internal combustion engine, and rotationally drives the internal combustion engine based on determination as to need for the supply of the lubrication oil.

In this construction, the rotational drive portion determines whether or not the supply of lubrication oil to at least a portion of the power transmission device by the lubrication oil supply device is necessary on the basis of the travel distance in the motor-powered travel following the stop of the rotational driving of the internal combustion engine, and rotationally drives the internal combustion engine on the basis of the determination as to the need for the supply of the lubrication oil. Therefore, the internal combustion engine can be rotationally driven at more appropriate timing to supply lubrication oil to at least a portion of the power transmission device than in the case where the internal combustion engine is rotationally driven in a fixed fashion, for example when a predetermined time elapses after the rotational driving of the internal combustion engine is stopped. This makes it possible to operate suitably also to the case where the travel distance in the motor-powered travel is long even if the time of stop of the rotational driving of the internal combustion engine is short, the case where the travel distance is short even if the time of stop is long, etc. Therefore, the incidence of excessiveness or insufficiency of the supply of lubrication oil to various portions in the power transmission device is restrained, and the fuel consumption efficiency improves.

A second aspect of the invention relates to a control device for a hybrid vehicle driving device. The hybrid vehicle driving device includes: an internal combustion engine and an electric motor as drive force sources; a power transmission device that transmits power of the drive force sources to a driving wheel; an electric storage device that supplies stored electric power to the electric motor; and a lubrication oil supply device that is operatively linked to the internal combustion engine and that supplies lubrication oil to at least a portion of the power transmission device due to rotational driving of the internal combustion engine. The hybrid vehicle driving device is capable of causing a motor-powered travel of a hybrid vehicle in which only the electric motor is used as a drive force source, by driving the electric motor with electric power from the electric storage device while the rotational driving of the internal combustion engine has been stopped. The control device for the hybrid vehicle driving device includes a rotational drive portion that determines whether or not supply of the lubrication oil to at least a portion of the power transmission device by the lubrication oil supply device is necessary based on an electric power amount stored in the electric storage device, and rotationally drives the internal combustion engine based on determination as to need for the supply of the lubrication oil.

In this construction, the rotational drive portion determines whether or not the supply of lubrication oil to at least a portion of the power transmission device by the lubrication oil supply device is necessary on the basis of the electric power amount stored in the electric storage device, and rotationally drives the internal combustion engine on the basis of the determination as to the need for the supply of the lubrication oil. Therefore, the internal combustion engine can be rotationally driven at more appropriate timing to supply lubrication oil to at least a portion of the power transmission device than in the case where the internal combustion engine is rotationally driven in a fixed fashion, for example, when a predetermined time elapses after the rotational driving of the internal combustion engine is stopped. This makes it possible to operate suitably also to the case where the travelable distance over which the motor-powered travel is feasible is long even if the time of stop of the rotational driving of the internal combustion engine is short or even if the travel distance in the motor-powered travel is short, the case where the travelable distance over which the motor-powered travel is feasible is short even if the time of stop is long or even if the travel distance in the motor-powered travel is long, etc. Therefore, the incidence of excessiveness or insufficiency of the supply of lubrication oil to various portions in the power transmission device is restrained, and the fuel consumption efficiency improves.

A third aspect of the invention relates to a control method for a hybrid vehicle driving device. The hybrid vehicle driving device includes: an internal combustion engine and an electric motor as drive force sources; a power transmission device that transmits power of the drive force sources to a driving wheel; an electric storage device that supplies stored electric power to the electric motor; and a lubrication oil supply device that is operatively linked to the internal combustion engine and that supplies lubrication oil to at least a portion of the power transmission device due to rotational driving of the internal combustion engine. The hybrid vehicle driving device is capable of causing a motor-powered travel of a hybrid vehicle in which only the electric motor is used as a drive force source, by driving the electric motor with electric power from the electric storage device while the rotational driving of the internal combustion engine has been stopped. The control method for the hybrid vehicle driving device includes: detecting a travel distance in the motor-powered travel after the rotational driving of the internal combustion engine has been stopped; determining whether or not supply of the lubrication oil to at least a portion of the power transmission device by the lubrication oil supply device is necessary based on the travel distance; and rotationally driving the internal combustion engine based on determination as to need for the supply of the lubrication oil.

A fourth aspect of the invention relates to a control method for a hybrid vehicle driving device. The hybrid vehicle driving device includes: an internal combustion engine and an electric motor as drive force sources; a power transmission device that transmits power of the drive force sources to a driving wheel; an electric storage device that supplies stored electric power to the electric motor; and a lubrication oil supply device that is operatively linked to the internal combustion engine and that supplies lubrication oil to at least a portion of the power transmission device due to rotational driving of the internal combustion engine. The hybrid vehicle driving device is capable of causing a motor-powered travel of a hybrid vehicle in which only the electric motor is used as a drive force source, by driving the electric motor with electric power from the electric storage device while the rotational driving of the internal combustion engine has been stopped. The control method for the hybrid vehicle driving device includes: detecting an electric power amount stored in the electric storage device; determining whether or not supply of the lubrication oil to at least a portion of the power transmission device by the lubrication oil supply device is necessary based on the electric power amount; and rotationally driving the internal combustion engine based on determination as to need for the supply of the lubrication oil.

A portion of the power transmission device may be a differential mechanism that has a first element linked to an engine as the internal combustion engine, and a second element linked to a first electric motor, and a third element linked to a transmission member and a second electric motor as the electric motor, and may distribute output of the engine to the first electric motor and the transmission member. This allows construction of a power transmission device that is capable of causing the motor-powered travel of the hybrid vehicle and causing the differential mechanism to function as a transmission even if operation oil for executing the shift is not supplied.

Furthermore, the differential mechanism may be constructed of a planetary gear device, and the first element may be a carrier of the planetary gear device, and the second element may be a sun gear of the planetary gear device, and the third element may be a ring gear of the planetary gear device. This construction reduces the dimension of the differential mechanism in the axis direction. Besides, the differential mechanism can be simply constructed from one planetary gear device.

Furthermore, the planetary gear device may also be a single-pinion type planetary gear device. This construction reduces the dimension of the differential mechanism in the axis direction. Furthermore, the differential mechanism is simply constructed of one single-pinion type planetary gear device.

Furthermore, the second electric motor may be operatively linked directly to the third element, and may also be linked to the third element via, for example, a speed reducer. That is, power of the second electric motor may be transmitted to the transmission member via a speed reducer. This allows size reduction of the second electric motor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described in detail hereinafter with reference to the drawings.

Figure 1:
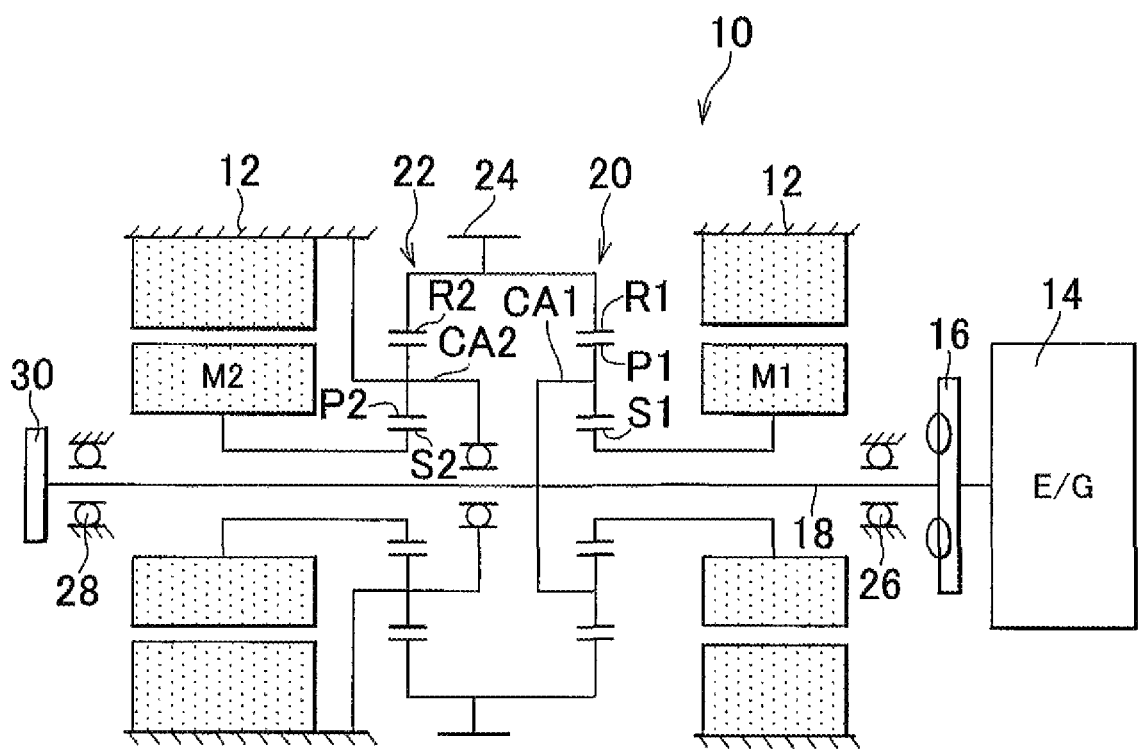
FIG. 1 is a skeleton diagram illustrating an example of a speed change mechanism that constitutes a portion of a hybrid vehicle in various embodiments of the invention.

A first embodiment of the invention will be described. FIG. 1 is a skeleton diagram illustrating a speed change mechanism 10 as a power transmission device that constitutes a portion of a driving device of a hybrid vehicle in various embodiments of the invention. In FIG. 1, the speed change mechanism 10 has, within a transaxle (T/A) case 12 (hereinafter, referred to as the case 12), a damper 16 which is operatively linked to an output shaft (e.g., the crankshaft) of an engine 14 that is an internal combustion engine, for example, a gasoline engine, a diesel engine, etc., as a vehicle travel-purpose drive force source, and which absorbs the pulsations from the engine 14 caused by its torque fluctuation or the like, an input shaft 18 that is rotationally driven by the engine 14 via the damper 16, a first electric motor M1, a first planetary gear device 20 that functions as a power distribution mechanism, a second planetary gear device 22 that functions as a speed reducer device, and a second electric motor M2, in that order from the engine 14 side.

This speed change mechanism 10 is suitably used in, for example, an FF (front engine, front wheel drive) type vehicle in which the speed change mechanism 10 is transversely placed. The power of the engine 14 is transmitted from an output gear 24 as an output rotating member of the speed change mechanism 10 that constitutes one of a pair of counter gears 32 to a pair of driving wheels 40, via the other one of the counter gear pair 32, a final gear pair 34, a differential gear device (final speed reducer) 36, a pair of axle shafts 38, etc., in that order (see FIG. 5). Thus, in this embodiment, the input shaft 18 and the engine 14 are operatively interlinked via the damper 16. While the output shaft of the engine 14 is an output rotating member of the engine 14 as a matter of course, this input shaft 18 also corresponds to an output rotating member of the engine 14.

The input shaft 18 is rotatably supported at its both ends by ball bearings 26, 28. One end of the input shaft 18 is linked to the engine 14 via the damper 16, so that the input shaft 18 is rotationally driven by the engine 14. The other end thereof is linked to an oil pump 30 as a lubrication oil supply device. As the input shaft 18 is rotationally driven, the oil pump 30 is rotationally driven, so that lubrication oil is supplied to various portions of the speed change mechanism 10, for example, the first planetary gear device 20, the second planetary gear device 22, the ball bearings 26, 28, etc.

The first planetary gear device 20 is a single-pinion type planetary gear device, and includes a first sun gear S1, first pinions P1, a first carrier CA1 that supports the first pinions P1 so that they are rotatable about their own axes and also revolvable, and a first ring gear R1 meshing with the first sun gear S1 via the first pinions P1, as rotating elements (elements).

The first planetary gear device 20 is a mechanical mechanism that mechanically distributes the output of the engine 14 transmitted to the input shaft 18, and distributes the output of the engine 14 to the first electric motor M1 and the output gear 24. Specifically, in this first planetary gear device 20, the first carrier CA1 is linked to the input shaft 18, that is, to the engine 14, and the first sun gear S1 is linked to the first electric motor M1, and the first ring gear R1 is linked to the output gear 24. Therefore, the first sun gear S1, the first carrier CA1 and the first ring gear R1 are relatively rotatable to each other, and the output of the engine 14 is distributed to the first electric motor M1 and the output gear 24. The output of the engine 14 distributed to the first electric motor M1 causes the first electric motor M1 to generate electric power, and the generated electric energy is stored, or is used to rotationally drive the second electric motor M2. Hence, the speed change mechanism 10 is caused to be in, for example, a state of a continuously variable transmission (electrical CVT state), that is, functions as an electrical continuously variable transmission in which the rotation of the output gear 24 can be continuously changed in speed despite a predetermined fixed rotation speed of the engine 14.

The second planetary gear device 22 is a single-pinion type planetary gear device, and includes a second sun gear S2, second pinions P2, a second carrier CA2 that supports the second pinions P2 so that they are rotatable about their own axes and also revolvable, and a second ring gear R2 meshing with the second sun gear S2 via the second pinions P2, as rotating elements. The ring gear R1 of the first planetary gear device 20 and the ring gear 12 of the second planetary gear device 22 are formed as an integrated composite gear. An outer peripheral portion of the composite gear is provided with the output gear 24.

In this second planetary gear device 22, the second carrier CA2 is linked to the case 12, which is a non-rotating member, and therefore is prevented from rotating. The second sun gear S2 is linked to the second electric motor M2, and the second ring gear R2 is linked to the output gear 24. Therefore, for example, at the time of a standing start, the second electric motor M2 is rotationally driven, so that the second sun gear S2 is rotated. The rotation is reduced in speed by the second planetary gear device 22, and is transmitted to the output gear 24.

Although the first electric motor M1 and the second electric motor M2 in the embodiment are each a so-called motor-generator that also has an electric power generation function, the first electric motor M1 has at least a generator (electric power generation) function for producing reaction force, and the second electric motor M2 has at least a motor (electric motor) function for outputting drive force as a drive force source for vehicle travel.

Figure 2:
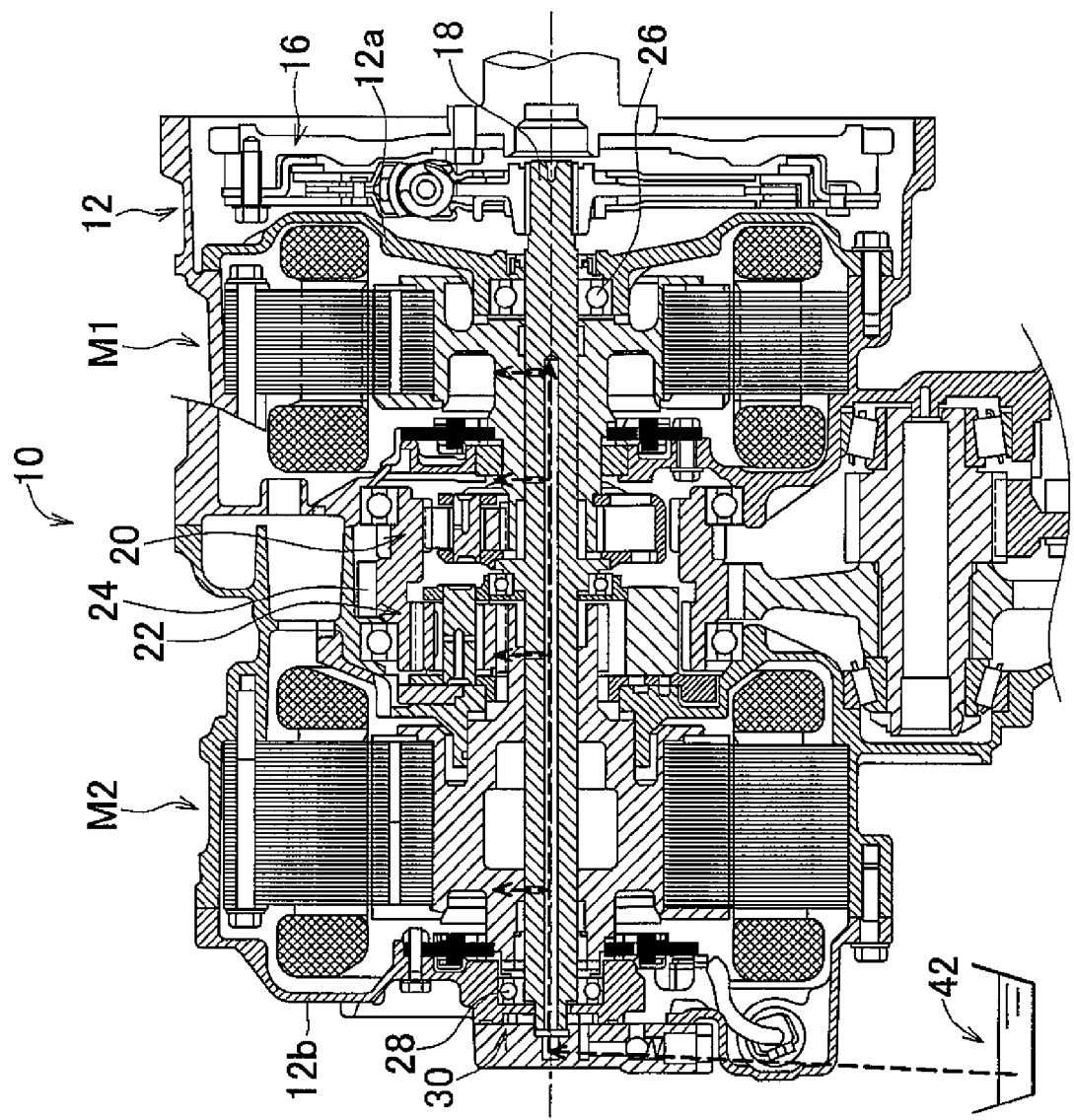
FIG. 2 is a sectional view for describing an internal structure of the speed change mechanism shown in FIG. 1.

FIG. 2 is a sectional view for describing an internal structure of the speed change mechanism 10 shown in FIG. 1. The speed change mechanism 10 includes the input shaft 18 provided within the case 12. An outer peripheral surface of an end side portion of the input shaft 18 is spline-fitted into the damper 16, which is linked to the engine 14 so as to absorb the pulsations caused by the torque fluctuation of the engine 14, or the like. The output of the engine 14 is transmitted to the input shaft 18 via the damper 16. On the other hand, an oil pump 30 is linked to the opposite end side of the input shaft 18. During the rotational driving of the engine 14, lubrication oil is pumped up by the oil pump 30 from an oil sump 42, and is supplied to the gears of the first planetary gear device 20 and the second planetary gear device 22, and ball bearings 26, 28, etc., as shown by an arrowed interrupted line. Incidentally, the gears of the first planetary gear device 20 and the second planetary gear device 22, the ball bearings 26, 28, etc., can also be lubricated to some degree by the lubrication oil splashed up by the final gear pair 34.

The input shaft 18 is rotatably supported at its two opposite ends by the ball bearing 26 that is pressed into an inner peripheral edge of a case wall surface 12a that extends from an outer peripheral side of the case 12 to an inner peripheral side thereof and the ball bearing 28 that is pressed into an inner peripheral edge of a case wall surface 12b that extends from an outer peripheral side of the case 12 to an inner peripheral side thereof. The first electric motor M1, the first planetary gear device 20, the second planetary gear device 22 and the second electric motor M2 are disposed in that order from the damper 16 side on the axis of the input shaft 18.

Figure 3:
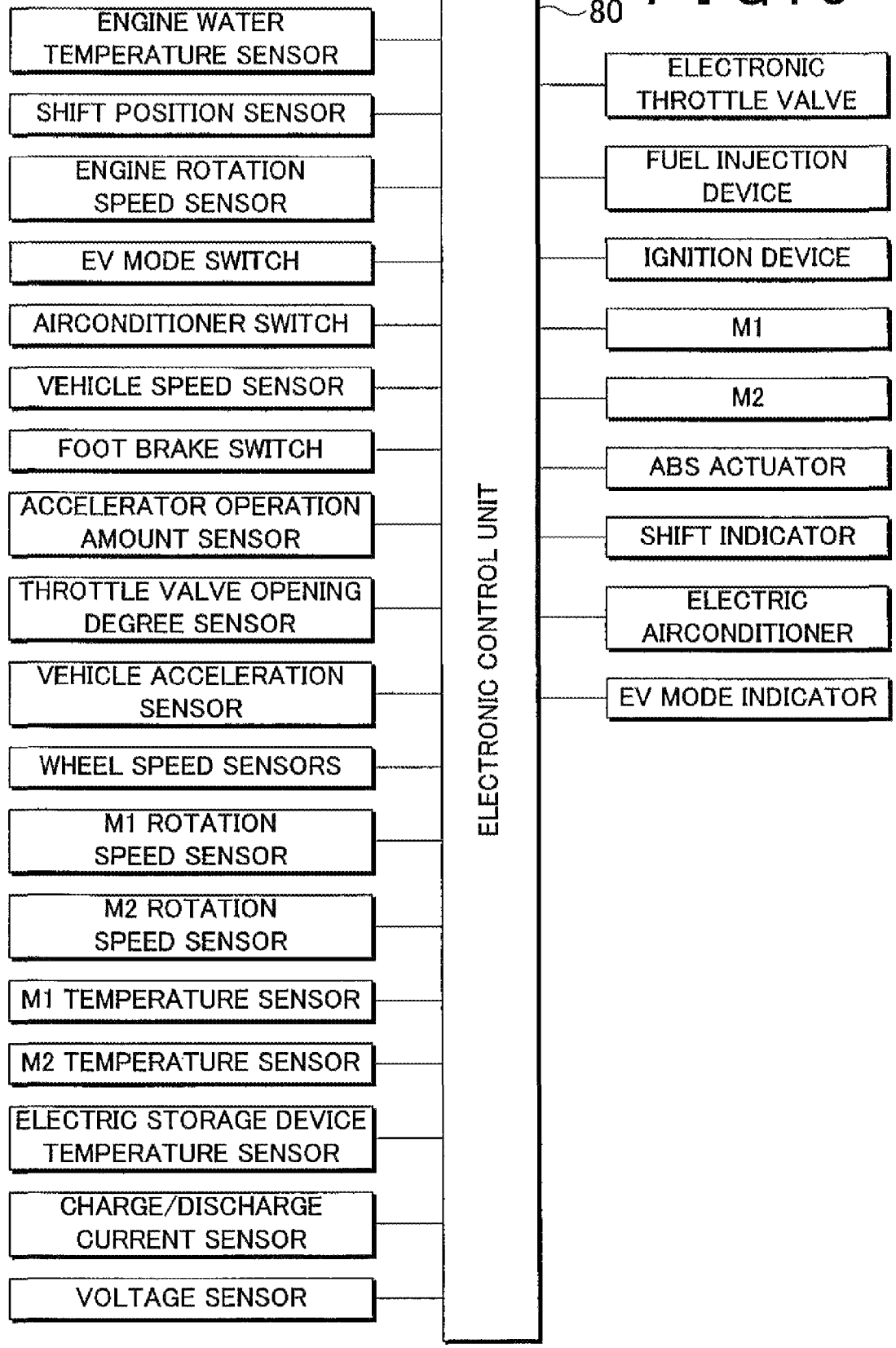
FIG. 3 is a diagram illustrating input/output signals with respect to an electronic control unit provided in the driving device shown in FIG. 1.

FIG. 3 shows examples of the signals that are input to an electronic control unit 80 for controlling the speed change mechanism 10 of this embodiment, and examples of the signals that are output from the electronic control unit 80. This electronic control unit 80 is constructed of a so-called microcomputer that is made up of a CPU, a ROM, a RAM, input/output interfaces, etc. By processing signals by following programs pre-stored in the ROM while utilizing the temporary memory function of the RAM, the electronic control unit 80 executes vehicle controls, including a hybrid drive control regarding the engine 14, the first and second electric motors M1, M2, and the like.

The electronic control unit 80 is supplied from various sensors, switches, etc. as shown in FIG. 3 with a signal representing the engine water temperature $TEMP_W$, a signal representing the shift position $P_{SH}$ of a shift lever 52 (see FIG.

4), a signal representing the engine rotation speed $N_E$ that is the rotation speed of the engine 14, a signal representing the presence/absence of a switch operation for setting a motor-powered travel (EV travel) mode, a signal representing the operation of an airconditioner, a signal representing the vehicle speed V that corresponds to the rotation speed of the output gear 24 (hereinafter, referred to as "output rotation speed") $N_{OUT}$, a signal representing the foot brake operation, a signal representing the accelerator operation amount Acc that is the amount of operation of an accelerator pedal which corresponds to a driver's requested amount of output, a signal representing the throttle valve opening degree $\theta_{TH}$, a signal representing the longitudinal acceleration G of the vehicle, a signal representing the wheel speed of each tire wheel, a signal representing the rotation speed $N_{M1}$ of the first electric motor M1 (hereinafter, referred to as "first electric motor rotation speed $N_{M1}$"), a signal representing the rotation speed $N_{M2}$ of the second electric motor M2 (hereinafter, referred to as "second electric motor rotation speed $N_{M2}$"), a signal representing the temperature $TH_{M1}$ of the first electric motor M1 (hereinafter, referred to as "first electric motor temperature $TH_{M1}$"), a signal representing the temperature $TH_{M2}$ of the second electric motor M2 (hereinafter, referred to as "second electric motor temperature $TH_{M2}$"), a signal representing the temperature $TH_{BAT}$ of an electric storage device 56 (see FIG. 5) (hereinafter, referred to as "electric storage device temperature $TH_{BAT}$"), a signal representing the charge current or discharge current $I_{CD}$ of the electric storage device 56 (hereinafter, referred to as "charge/discharge current $I_{CD}$" or "input/output current $I_{CD}$"), a signal representing the voltage $V_{BAT}$ of the electric storage device 56, a signal representing the charging capacity (state of charge) SOC of the electric storage device 56 calculated on the basis of the electric storage device temperature $TH_{BAT}$, the charge/discharge current $I_{CD}$ and the voltage $V_{BAT}$, etc.

The electronic control unit 80 outputs control signals to an engine output control device 58 (see FIG. 5) that controls the engine output, for example, a drive signal to a throttle actuator 64 that changes the throttle valve opening degree $\theta_{TH}$ of the electronic throttle valve 62 provided in an intake pipe 60 of the engine 14, a fuel supply amount signal that controls the amount of fuel supplied by the fuel injection device 66 into the intake pipe 60 or the cylinders of the engine 14, an ignition signal that commands the ignition timing of the engine 14 from the ignition device 68, a command signal that commands operation of the electric motor M1 and M2, an ABS actuation signal for actuating the ABS actuator that prevents wheel slipping at the time of braking, a shift position (operation position) display signal for operating the shift indicator, an electric airconditioner drive signal for operating the electric air condition, an EV mode display signal that indicates that the EV travel mode sign has been selected, etc.

Figure 4:
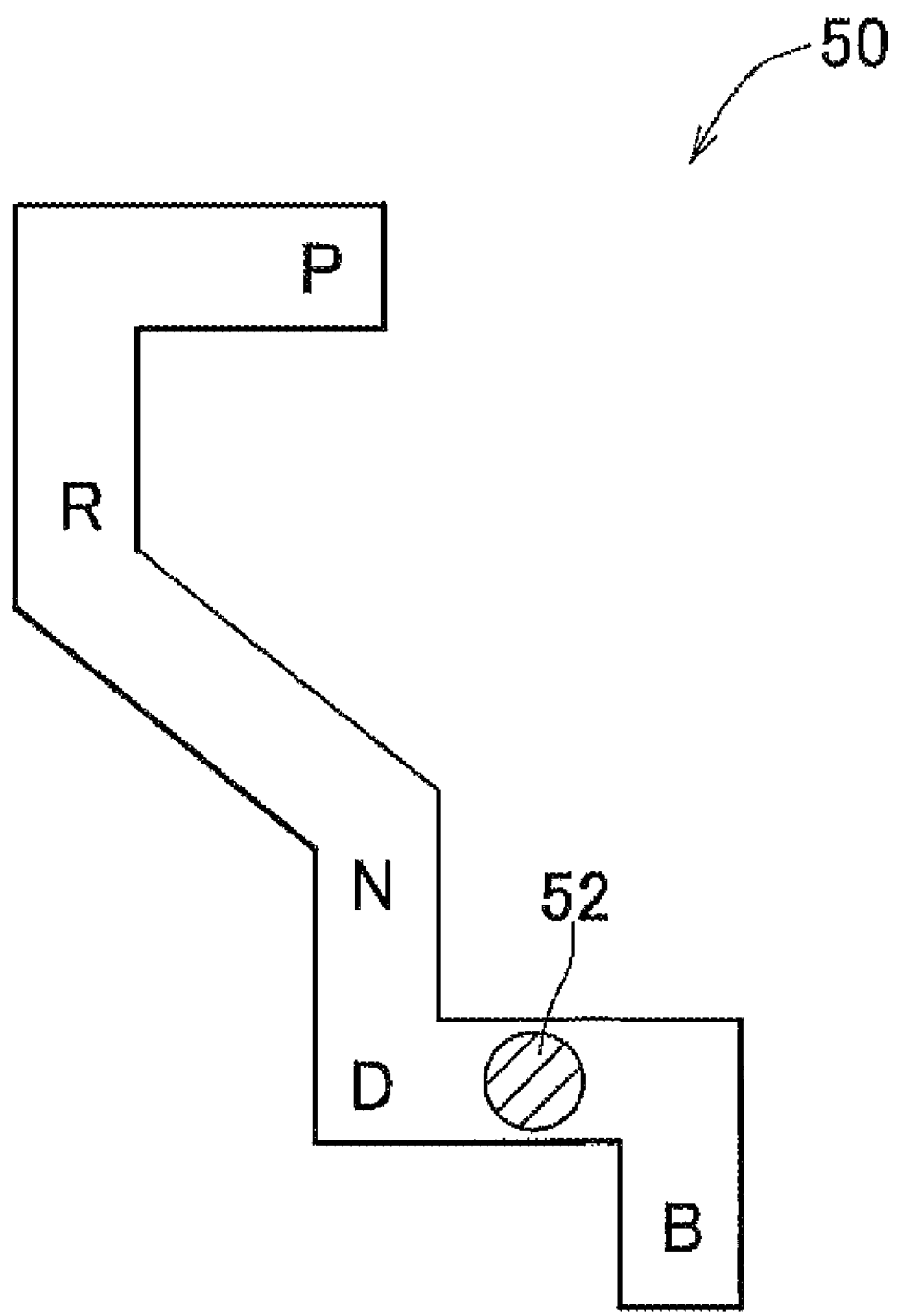
FIG. 4 shows an example of a shift operation device equipped with a shift lever which is operated to select any one of a plural kinds of shift positions.

FIG. 4 is a diagram showing an example of a shift operation device 50 as a switching device for manually switching among a plurality of kinds of shift positions $P_{SH}$. This shift operation device 50 includes the shift lever 52 that is disposed, for example, at a side of a driver's seat, and that is operated in order to select one of plural kinds of shift positions $P_{SH}$.

The shift lever 52 is provided so as to be manually operated to a parking position "P (Parking)" for bringing the speed change mechanism 10 to a neutral state in which the power transmission pathway is disconnected and for locking the output gear 24, a reverse travel position "R (Reverse)" for reverse travel, a neutral position "N (Neutral)" for bringing the speed change mechanism 10 to a neutral state by, for example, forcing the first electric motor M1 and the second electric motor M2 to stop operating so that the drive force on the output gear 24 becomes zero, a forward travel automatic shift position "D (Drive)" for causing the execution of an automatic shift control in which the speed change ratio $\gamma 0$ is steplessly changed in the shiftable range of the speed change mechanism 10, and an engine brake position "B (Brake)" for obtaining an increased engine brake effect by performing the deceleration through the regenerative braking via the second electric motor M2 simultaneously with the release of the accelerator pedal.

Among the shift positions $P_{SH}$, that is, the foregoing "P" to "B" positions, the "P" position and the "N" position are non-travel positions that are selected when the vehicle is not to be run, and are also non-driving positions for selecting a switch of the power transmission pathway to a power transmission disconnected state. Besides, the "R" position and the "D" position are travel positions that are selected when the vehicle is to be run, and are driving positions for selecting the switch of the power transmission pathway to a power transmission capable state.

Figure 5:
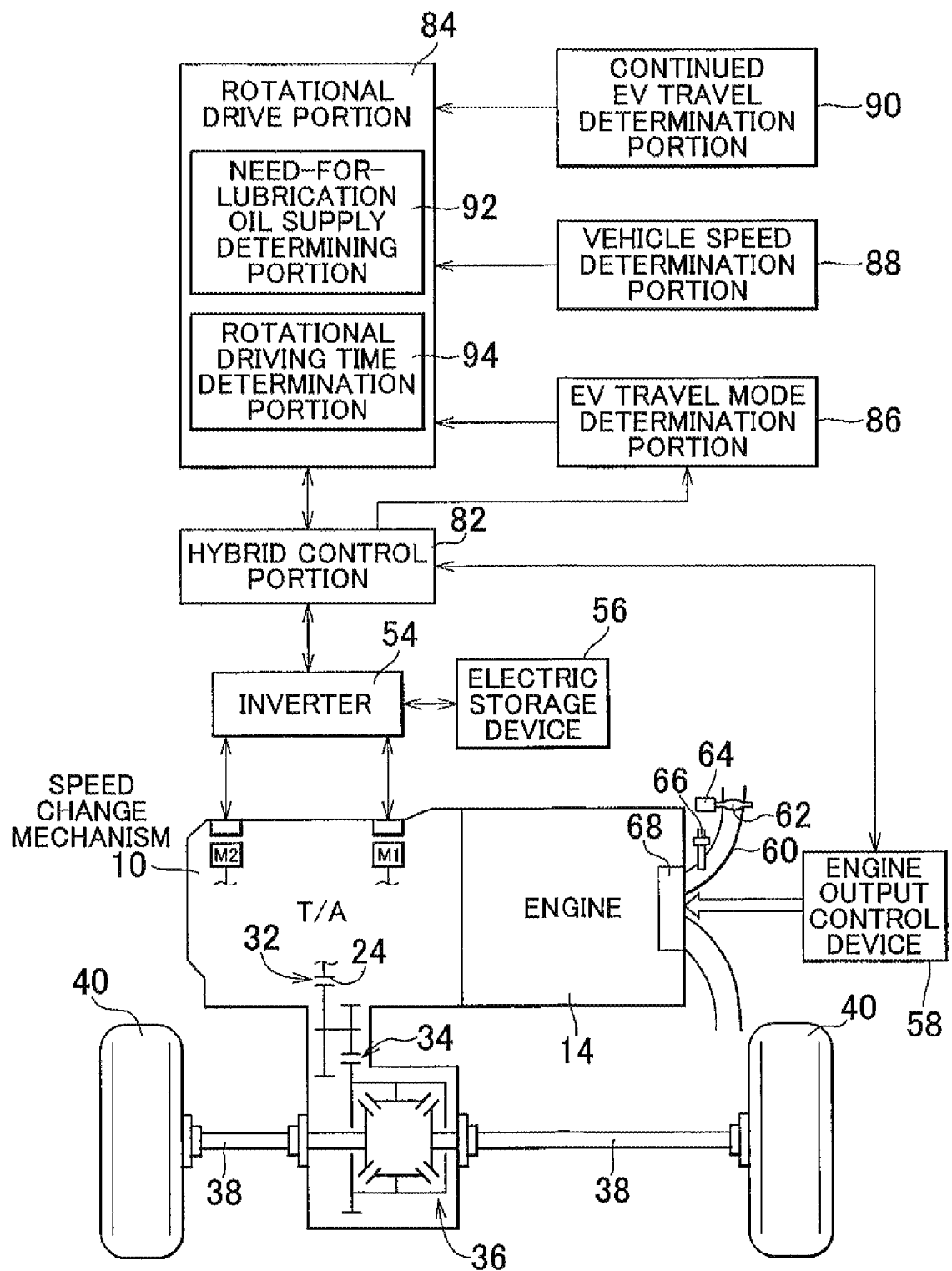
FIG. 5 is a functional block diagram illustrating portions of the control functions of the electronic control unit shown in FIG. 3.

FIG. 5 is a functional block diagram illustrating portions of the control functions of the electronic control unit 80. In FIG. 5, the hybrid control portion 82 operates the engine 14 in an efficient operation region, and also controls the speed change ratio $\gamma 0$ of the speed change mechanism 10 as an electrical continuously variable transmission by optimally changing the proportion in drive force between the engine 14 and the second electric motor M2, and the reaction force caused by the electric power generation performed by the first electric motor M1. For example, at the present traveling vehicle speed V, a target (required) output of the vehicle is calculated from the vehicle speed V and the accelerator operation amount Acc as a driver's requested amount of output, and a needed total target output is calculated from the target output of the vehicle and the required charge value, and a target engine output is calculated by taking into account the transmission loss, the accessory load, the assist torque of the second electric motor M2, etc. so that the total target output will be obtained. Then, the engine 14 is controlled and the amount of power generation of the first electric motor M1 are controlled so as to achieve an engine rotation speed $N_E$ and an engine torque $T_E$ that provide the target engine output.

That is, the hybrid control portion 82 sets, for example, such a target value of the speed change ratio $\gamma 0$ of the speed change mechanism 10 as to achieve an engine torque $T_E$ and an engine rotation speed $N_E$ that produce an engine output that is needed in order to satisfy the target output (a total target output, or a required drive force), and steplessly controls the speed change ratio $\gamma 0$ within the changeable range of change so as to achieve the target value of the speed change ratio $\gamma 0$, so that the engine 14 will be operated following a well-known optimum specific fuel consumption curve (a fuel consumption map, or a relationship) of the engine 14 that is empirically found and stored beforehand so as to achieve both good fuel economy and good driveability at the time of stepless-shift travel in a two-dimensional coordinate system that is formed by the engine rotation speed $N_E$ and the output torque (engine torque) $T_E$ of the engine 14.

At this time, the hybrid control portion 82 supplies the electric energy generated by the first electric motor M1 to the electric storage device 56 or the second electric motor M2 through an inverter 54, so that a major portion of the power of the engine 14 is mechanically transmitted to the output gear 24 and a portion of the power of the engine 14 is consumed for the power generation of the first electric motor M1, and is thereby converted into electric energy. The thus-generated electric energy is supplied to the second electric motor M2 through the inverter 54, so that the second electric motor M2 is driven and the power of the second electric motor M2 is transmitted to the output gear 24. Devices or appliances involved in the process of the generation of electric energy to the consumption thereof in the second electric motor M2 constitute an electric path from the conversion of a portion of the power of the engine 14 into electric energy to the conversion of the electric energy into mechanical energy.

Furthermore, the hybrid control portion 82, owing to the electrical CVT function of the speed change mechanism 10, is capable of controlling the engine rotation speed $N_E$ to a substantially constant speed or arbitrary rotation speed by controlling, for example, the first electric motor rotation speed $N_{M1}$, regardless of whether the vehicle is traveling or at a stop. Specifically, the hybrid control portion 82 is capable of rotationally driving the engine 14 via the first electric motor M1 that is operatively linked to the input shaft 18 (i.e., the output shaft of the engine 14) via the first planetary gear device 20, by causing the first electric motor M1 to function as a driving device capable of transmitting power to the input shaft 18. For example, in the case where the engine rotation speed $N_E$ is to be raised during a travel of the vehicle, the hybrid control portion 82 executes the raise of the first electric motor rotation speed $N_{M1}$ while keeping substantially constant the output rotation speed $N_{OUT}$ that is constrained by the vehicle speed V (the driving wheels 40).

Besides, the hybrid control portion 82 also functionally includes an engine output control portion that executes an output control of the engine 14 so as to produce a needed engine output by outputting to an engine output control device 58 one of or a combination of two or more of control commands that cause the engine output control device 58 to control the opening/closing of the electronic throttle valve 62 via the throttle actuator 64 for the throttle control, or to control the amount of fuel injection or the timing of fuel injection of the fuel injection device 66 for a fuel injection control, or to control the ignition timing of an ignition device 68, such as an igniter or the like, for an ignition timing control. For example, the hybrid control portion 82 executes the throttle control so that the throttle valve opening degree $\theta_{TH}$ increases as the accelerator operation amount Acc increases, by driving the throttle actuator 60 basically on the basis of the accelerator operation amount Acc from a pre-stored relationship (not shown). The engine output control device 58, following the command from the hybrid control portion 82, executes the engine torque control by controlling the opening/closing of the electronic throttle valve 62 through the throttle actuator 64 for the throttle control, or controlling the fuel injection of the fuel injection device 66 for the fuel injection control, or controlling the ignition timing of the ignition device 68, such as an igniter or the like, for the ignition timing control.

Besides, the hybrid control portion 82 is also capable of executing a motor-powered travel (EV travel) in which only the second electric motor M2 is used as a drive force source, by driving the second electric motor M2 with the electric power from the electric storage device 56 while the operation of the engine 14 is stopped. For example, the EV travel by the hybrid control portion 82 is executed in a relatively low output torque $T_{OUT}$ region, that is, a low engine torque $T_E$ region, in which it is generally considered the engine efficiency is poor in comparison with a high torque region, or in a relatively low vehicle speed region in which the vehicle speed V is relatively low, that is, a low load region.

During the EV travel, in order to restrain the drag of the engine 14 during a stop of operation thereof and therefore improve the fuel economy, the hybrid control portion 82 keeps the engine rotation speed $N_E$ at zero or substantially zero if necessary through the electrical CVT function (differential effect) of the speed change mechanism 10, for example, by causing the first electric motor M1 to be in a non-load state and therefore to idle. That is, during the EV travel, the hybrid control portion 82 stops not merely the operation of the engine 14, but stops the rotation of the engine 14 as well.

The hybrid control portion 82 also functionally includes an engine start control portion that performs the starting of the engine 14 during a stop of the vehicle or the EV travel thereof. For example, the hybrid control portion 82 starts the engine 14 as follows. That is, the hybrid control portion 82 raises the engine rotation speed $N_E$ to a predetermined rotation speed $N_E'$ that allows complete combustion by raising the first electric motor rotation speed $N_{M1}$ through electrification of the first electric motor M1, that is, by causing the first electric motor M1 to function as a starter. Then, at or above the rotation speed $N_E'$, for example, at an engine rotation speed $N_E$ equal to, or greater than the idling rotation speed which allows autonomous rotation, the hybrid control portion 82 supplies (injects) fuel via the fuel injection device 66 and ignites the fuel via the ignition device 68.

Furthermore, during an engine-powered travel in which the engine 14 is used as a drive force source, the hybrid control portion 82 is able to perform a so-called torque assist for supplementing the power of the engine 14 through the above-described electric path, that is, by supplying the electric energy from the first electric motor M1 and/or the electric energy from the electric storage device 56 to the second electric motor M2 to drive the second electric motor M2 and then applying the torque therefrom to the driving wheels 40.

Furthermore, the hybrid control portion 82 is able to establish a state where the first electric motor M1 is caused to be in a non-load state and thus freely rotate, that is, idle, and therefore is caused to bring about a state in which the speed change mechanism 10 is not able to transmit torque, that is, a state which is equivalent to a state in which the power transmission pathway in the speed change mechanism 10 is disconnected, and where the second electric motor M2 is also caused to be in a non-load state so that no output is produced from the speed change mechanism 10. Specifically, the hybrid control portion 82 is able to cause the speed change mechanism 10 to be in a neutral state by causing the electric motors M1, M2 to be in a non-load state.

During the EV travel mode, which is a control fashion in which the vehicle travels using only the second electric motor M2 as a drive force source while the rotation of the engine 14 is stopped, the oil pump 30 is not rotationally driven. Therefore, during the EV travel mode, there is a possibility that lubrication oil cannot be sufficiently supplied to various portions in the speed change mechanism 10, such as the various gears of the first planetary gear device 20 and the second planetary gear device 22, the ball bearings 26, 28, etc., even though lubrication oil is splashed up by the final gear pair 34.

Therefore, it is conceivable that during the EV travel mode, lubrication oil is supplied to various portions in the speed change mechanism 10 by, for example, compulsorily rotationally driving the engine 14 to rotationally drive the oil pump 30 at or after the elapse of a predetermined time following the stop of the engine 14. However, even while the predetermined time has not elapsed following the stop of the engine 14, the supply of lubrication oil to various portions in the speed change mechanism 10 becomes necessary if the travel distance in the EV travel mode is long. On the other hand, even after the predetermined time has elapsed following the stop of the engine 14, the supply of lubrication oil to various portion in the speed change mechanism 10 is not necessary if the travel distance in the EV travel mode is short.

Therefore, if the engine 14 is rotationally driven in a fixed fashion in the case where the predetermined time has elapsed after the engine 14 stops, the supply of lubrication oil to various portions in the speed change mechanism 10 may become excessive or insufficient, and thus there is possibility of decline in energy efficiency, for example, fuel consumption efficiency.

Therefore, this embodiment includes a rotational drive portion 84 that determines whether or not the supply of lubrication oil to various portions in the speed change mechanism 10 by the oil pump 30 is necessary on the basis of the travel distance in the EV travel following the stop of the rotational driving of the engine 14, and then rotationally drives the engine 14 on the basis of the determination as to the need for the supply of lubrication oil.

Concretely, an EV travel mode determination portion 86 determines whether or not the present vehicle state is the EV travel mode, for example, on the basis of whether or not it is determined that the present vehicle state is a vehicle state in which the EV travel is to be executed by the hybrid control portion 82 or whether or not the EV travel mode has actually been set. That is, it is determined that the present vehicle state is the EV travel mode if the EV travel mode has been set or the present vehicle state is a vehicle state in which the EV travel is to be executed regardless of whether or not the vehicle is actually undergoing the EV travel.

A vehicle speed determination portion 88 determines whether or not the vehicle speed V is equal to or greater than a predetermined vehicle speed V'. The predetermined vehicle speed V' is a criterion vehicle speed that is empirically found and determined beforehand for determining whether or not it is necessary to perform the supply of lubrication oil, for example, by using only the EV travel distance $L_{EV}$ as the condition, since the EV travel distance $L_{EV}$ during the EV travel becomes longer when the vehicle speed V is higher. For example, the predetermined vehicle speed V' is set at about 5 km/h.

A continued EV travel determination portion 90 determines whether or not an EV travel time $T_{EV}$ during which the EV travel has been performed has continued so as to be greater than or equal to a predetermined time T'. The predetermined time T' is a criterion time that is empirically found and determined beforehand for determining whether or not the EV travel time $T_{EV}$ is an EV travel time that requires that it be determined whether or not the supply of lubrication oil is necessary, for example, by using the EV travel distance $L_{EV}$ as the condition, since as the EV travel time $T_{EV}$ becomes longer, the EV travel distance $L_{EV}$ becomes longer.

The rotational drive portion 84 includes a need-for-lubrication oil supply determining portion 92 that determines whether or not the supply of lubrication oil to various portions in the speed change mechanism 10 by the oil pump 30 is necessary on the basis of the EV travel distance $L_{EV}$ if EV travel mode determination portion 86 determines that the present vehicle state is the EV travel mode.

The need-for-lubrication oil supply determining portion 92 determines whether or not the supply of lubrication oil by the oil pump 30 is necessary on the basis of whether or not the EV travel distance $L_{EV}$ has exceeded a predetermined distance L'. The predetermined distance L' is, for example, a criterion distance that is empirically found and determined beforehand for determining whether or not the present EV travel distance $L_{EV}$ is such that the supply of lubrication oil by the oil pump 30 is needed. Incidentally, the need-for-lubrication oil supply determining portion 92 may use, as a condition for executing the determination as to whether the supply of lubrication oil by the oil pump 30 is necessary, the occasion when the vehicle speed determination portion 88 determines that the vehicle speed V is greater than or equal to the predetermined vehicle speed V', or the occasion when the continued EV travel determination portion 90 determines that the EV travel time $T_{EV}$ that has continued is greater than or equal to the predetermined time T', in addition to using as an execution condition the occasion when the EV travel mode determination portion 86 determines that the present vehicle state is the EV travel mode.

In the case where the need-for-lubrication oil supply determining portion 92 determines that the supply of lubrication oil by the oil pump 30 is necessary on the basis of the determination that the EV travel distance $L_{EV}$ has exceeded the predetermined distance L', the rotational drive portion 84 outputs to the hybrid control portion 82 a rotational-driving-of-engine command to rotationally drive the engine 14 at or above a predetermined rotational driving speed $N_{ED}$ by using the first electric motor M1. Following the rotational-driving-of-engine command, the hybrid control portion 82 raises the engine rotation speed $N_E$ to or above the predetermined rotational driving speed $N_{ED}$ by raising the first electric motor rotation speed $N_{M1}$. The rotational-driving-of-engine command may also be a command to rotationally drive the engine 14 by starting (starting up) the engine 14, instead of rotationally driving the engine 14 via the first electric motor M1. In this case, the hybrid control portion 82, following the rotational-driving-of-engine command, starts the engine 14.

Besides, the rotational drive portion 84 includes a rotational driving time determination portion 94 that determines whether or not a rotational driving time $T_{ED}$ of rotationally driving the engine 14 by the hybrid control portion 82 has reached a predetermined rotational driving time $T_{ED}'$. If the rotational driving time determination portion 94 determines that the predetermined rotational driving time $T_{ED}'$ has elapsed, the rotational drive portion 84 outputs to the hybrid control portion 82 an engine rotation stop command to stop the rotational driving of the engine 14 replacing the rotational-driving-of-engine command. The hybrid control portion 82, following the engine rotation stop command, stops the rotational driving of the engine 14, for example, by causing the first electric motor M1 to be in a non-load state. Incidentally, if the engine 14 is started in accordance with the rotational-driving-of-engine command, the operation of the engine 14 is simultaneously stopped.

The predetermined rotational driving speed $N_{ED}$ and the predetermined rotational driving time $T_{ED}'$ mentioned above are the rotational driving speed (rpm) and the rotational driving time (sec) of the engine 14 that are empirically found and determined beforehand for making the overall delivery of lubrication oil to various portions in the speed change mechanism 10 realized by the supply of lubrication oil by the oil pump 30 associated with the rotational driving of the engine 14. For example, the predetermined rotational driving speed $N_{ED}$ is set at the idling rotation speed of the engine 14, and the predetermined rotational driving time $T_{ED}'$ is set at several seconds to several ten seconds.

Figure 6:
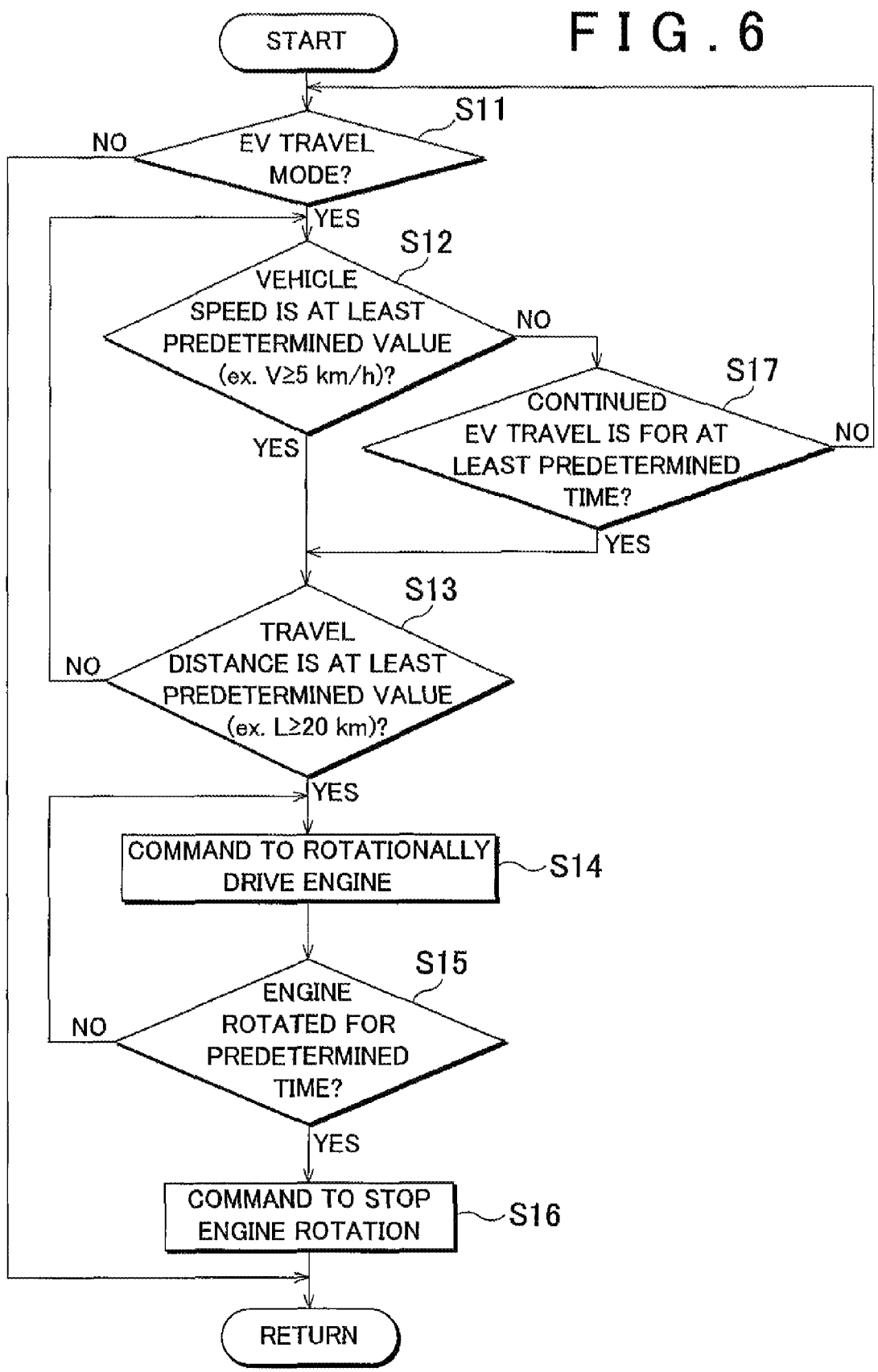
FIG. 6 is a flowchart illustrating a control operation of the electronic control unit shown in FIG. 3, that is, a control operation for supplying lubrication oil to various portions in the speed change mechanism by rotationally driving the engine at appropriate timing after stopping the rotational driving of the engine.

FIG. 6 is a flowchart illustrating a portion of the control operations of the electronic control unit 80, that is, a control operation for supplying lubrication oil to various portions in the speed change mechanism 10 by rotationally driving the engine 14 at appropriate timing after stopping the rotational driving of the engine 14. The control operation of the flowchart is repeatedly executed in a very short cycle time of, for example, several msec to several ten msec.

In FIG. 6, firstly, in step S11 (hereinafter, "step" is omitted), which corresponds to the EV travel mode determination portion 86, it is determined whether or not the present vehicle state is the EV travel mode.

If a negative determination is made in S11, this routine is ended. However, if an affirmative determination is made, the process proceeds to S12, which corresponds to the vehicle speed determination portion 88. In S12, it is determined whether or not the vehicle speed V is greater than or equal to the predetermined vehicle speed V'.

If a negative determination is made in S12, the process proceeds to S17, which corresponds to the continued EV travel determination portion 90. In S17, it is determined whether the EV travel time $T_{EV}$ during which the EV travel has been performed has continued so as to be greater than or equal to the predetermined time T'. If a negative determination is made in S17, the process returns to S11.

If an affirmative determination is made in S12 or an affirmative determination is made in S17, the process proceeds to S13, which corresponds to the need-for-lubrication oil supply determining portion 92. In S13, it is determined whether or not the supply of lubrication oil by the oil pump 30 is necessary on the basis of whether or not the EV travel distance $L_{EV}$ has exceeded the predetermined distance L'.

If a negative determination is made in S13, the process returns to S12. If an affirmative determination is made in S13, the process proceeds to S14, which corresponds to the rotational drive portion 84. In S14, the rotational-driving-of-engine command to rotationally drive the engine 14 at or above the predetermined rotational driving speed $N_{ED}$ via the first electric motor M1 is output, so that the engine rotation speed $N_E$ is raised to or above the predetermined rotational driving speed $N_{ED}$ by raising the first electric motor rotation speed $N_{M1}$. Alternatively, a rotational-driving-of-engine command to rotationally drive the engine 14 by starting the engine 14 may be output, so that the engine 14 will be started.

Subsequently, in S15, which corresponds to the rotational driving time determination portion 94, it is determined whether or not the rotational driving time $T_{ED}$ of the engine 14 caused by S14 has reached the predetermined rotational driving time $T_{ED}$'.

If a negative determination is made in S15, the process returns to S14. If an affirmative determination is made in S15, the process proceeds to S16, which corresponds to the rotational drive portion 84. In S16, replacing the rotational-driving-of-engine command output in S14, an engine rotation stop command to stop the rotational driving of the engine 14 is output, so that the rotational driving of the engine 14 is stopped by causing the first electric motor M1 to be in a non-load state. In the case where the engine 14 has been started in S14, the operation of the engine 14 is also stopped at the same time.

In the flowchart of FIG. 6, it is not altogether necessary to execute the determination processes in S12 and S17. It is permissible that if an affirmative determination is made in S11, the process of S13 may be executed.

As described above, according to this embodiment, the rotational drive portion 84 determines whether or not the supply of lubrication oil to various portions in the speed change mechanism 10 by the oil pump 30 is necessary on the basis of the EV travel distance $L_{EV}$ following the stop of the rotational driving of the engine 14, and rotationally drives the engine 14 on the basis of the determination as to the need for the supply of lubrication oil. Therefore, in comparison with the case where the engine 14 is rotationally driven in a fixed fashion, for example, when a predetermined time elapses, the engine 14 can be rotationally driven at appropriate timing so as to supply lubrication oil to various portions in the speed change mechanism 10. This makes it possible to operate suitably also to the case where the EV travel distance $L_{EV}$ is long even if the time of stop of the rotational driving of the engine 14 is short, or in the case where the EV travel distance $L_{EV}$ is short even if the time of stop of the engine 14 is long, or the like. Therefore, the incidence of excessive or insufficient supply of lubrication oil to various portions in the speed change mechanism 10 will be restrained, and the fuel consumption efficiency will improve.

Furthermore, according to the embodiment, in the case where the EV travel distance $L_{EV}$ has exceeded the predetermined distance L', the rotational drive portion 84 determines that the supply of lubrication oil by the oil pump 30 is necessary, and rotationally drives the engine 14. Specifically, the engine 14 is rotationally driven in the case where the EV travel distance $L_{EV}$ has exceeded the predetermined distance L' even if the time of stop of the rotational driving of the engine 14 is short. On the other hand, the engine 14 is not rotationally driven in the case where the EV travel distance $L_{EV}$ is lower than the predetermined distance L' even if the time of the stop of the engine 14 is long. In consequence, the incidence of excessive or insufficient supply of lubrication oil to various portions in the speed change mechanism 10 will be restrained.

Furthermore, according to this embodiment, since the rotational drive portion 84 rotationally drives the engine 14 via the first electric motor M1 or rotationally drives the engine 14 by starting the engine 14, lubrication oil is appropriately supplied to various portions in the speed change mechanism 10 via the oil pump 30.

Next, other embodiments of the invention will be described. In the following description, the portions that are common among embodiments are assigned with the same reference characters, and descriptions thereof are omitted.

A second embodiment of the invention will be described. In the foregoing first embodiment, in the case where the EV travel distance $L_{EV}$ has exceeded the predetermined distance L', the rotational drive portion 84 rotationally drives the engine 14 at or above the predetermined rotational driving speed $N_{ED}$ via the first electric motor M1, or rotationally drives the engine 14 by starting the engine 14. When the engine rotation speed $N_E$ is raised by the first electric motor M1, the first ring gear R1 (output gear 24) need to bear reaction force. Therefore, there is possibility of torque fluctuation occurring at the output side in association with rotational driving the engine 14. Therefore, if the engine 14 is rotationally driven during the EV travel, there is possibility of giving an uncomfortable shock to a user due to the behavior of the vehicle, and thus declining the driveability. In particular, in the case where the engine is started, the foregoing problems conspicuously occur due to the engine torque $T_E$ generated. Furthermore, depending on the frequency and timing of starting the engine 14, the fuel economy may deteriorate and the influence on exhaust gas quality may become a problem.

Therefore, in the case where the EV travel distance $L_{EV}$ has exceeded the predetermined distance L', the rotational drive portion 84 executes the rotational driving of the engine 14 during a stop of the vehicle.

Figure 7:
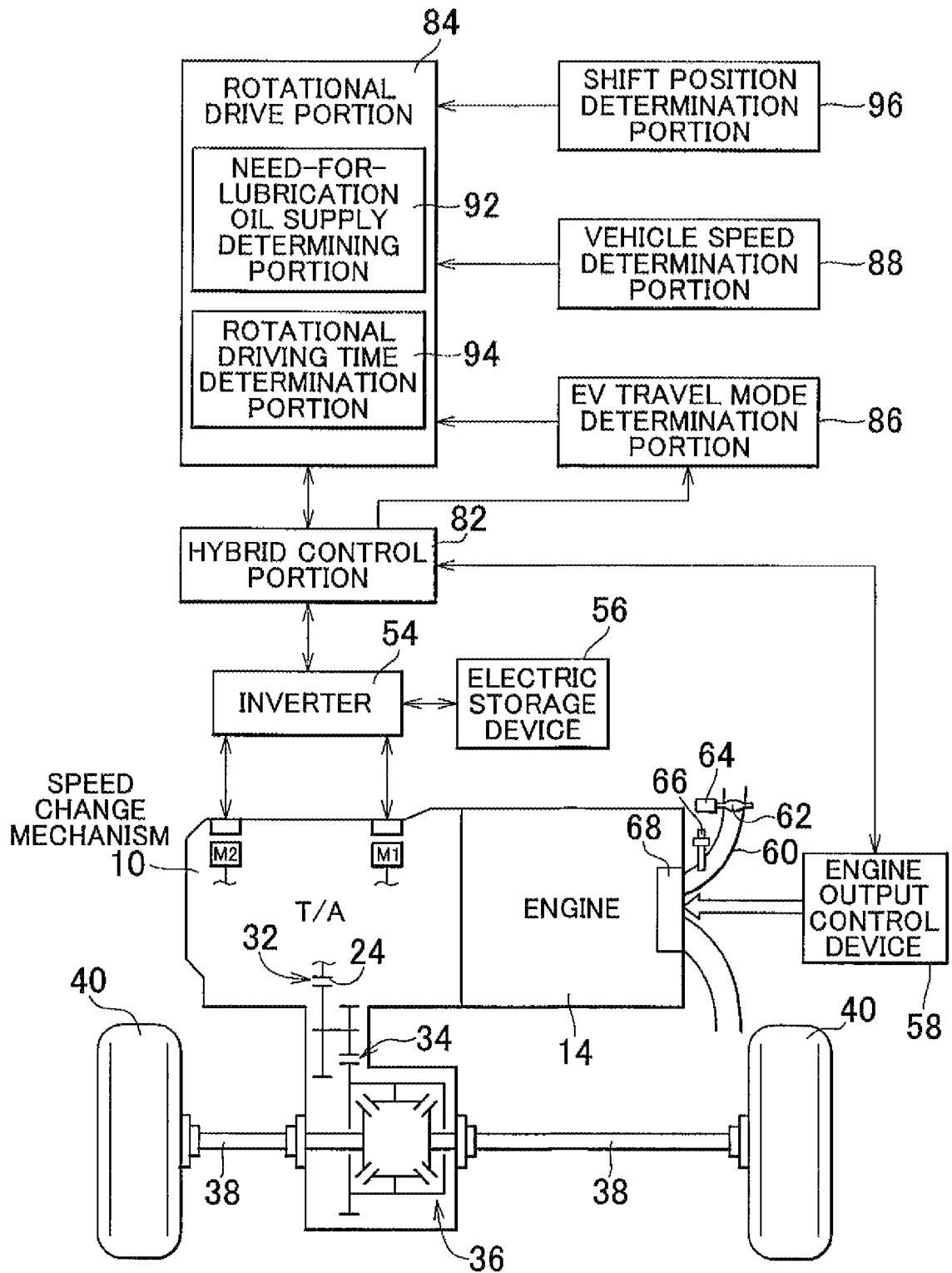
FIG. 7 is a functional block diagram illustrating portions of the control functions of the electronic control unit shown in FIG. 3, and corresponds to the functional block diagram of FIG. 5 but shows a different embodiment.

This will be concretely described with reference to FIG. 7. FIG. 7 is a functional block diagram illustrating portions of the control functions performed by the electronic control unit 80, and corresponds to FIG. 5 but shows a different embodiment. In FIG. 7, instead of or in addition to the foregoing functions, the vehicle speed determination portion 88 determines whether or not the vehicle speed V is substantially zero, that is, in a predetermined vehicle speed range that allows the determination that the vehicle speed is zero.

The shift position determination portion 96 determines the present position of the shift lever 52 on the basis of a signal that represents the shift position $P_{SH}$ of the shift lever 52, and determines whether or not the position of the shift lever 52 is the "P" position. That is, the shift position determination portion 96 determines whether or not the shift position of the shift lever 52 is the "P" position at which the output gear 24 is mechanically locked and the influence of the torque fluctuation associated with the rotational driving of the engine 14 is restrained.

In the case where it is determined by the need-for-lubrication oil supply determining portion 92 that the supply of lubrication oil by the oil pump 30 is necessary, the rotational drive portion 84 outputs the rotational-driving-of-engine command to the hybrid control portion 82 on the condition that it is determined by the shift position determination portion 96 that the position of the shift lever 52 is the "P" position.

Figure 8:
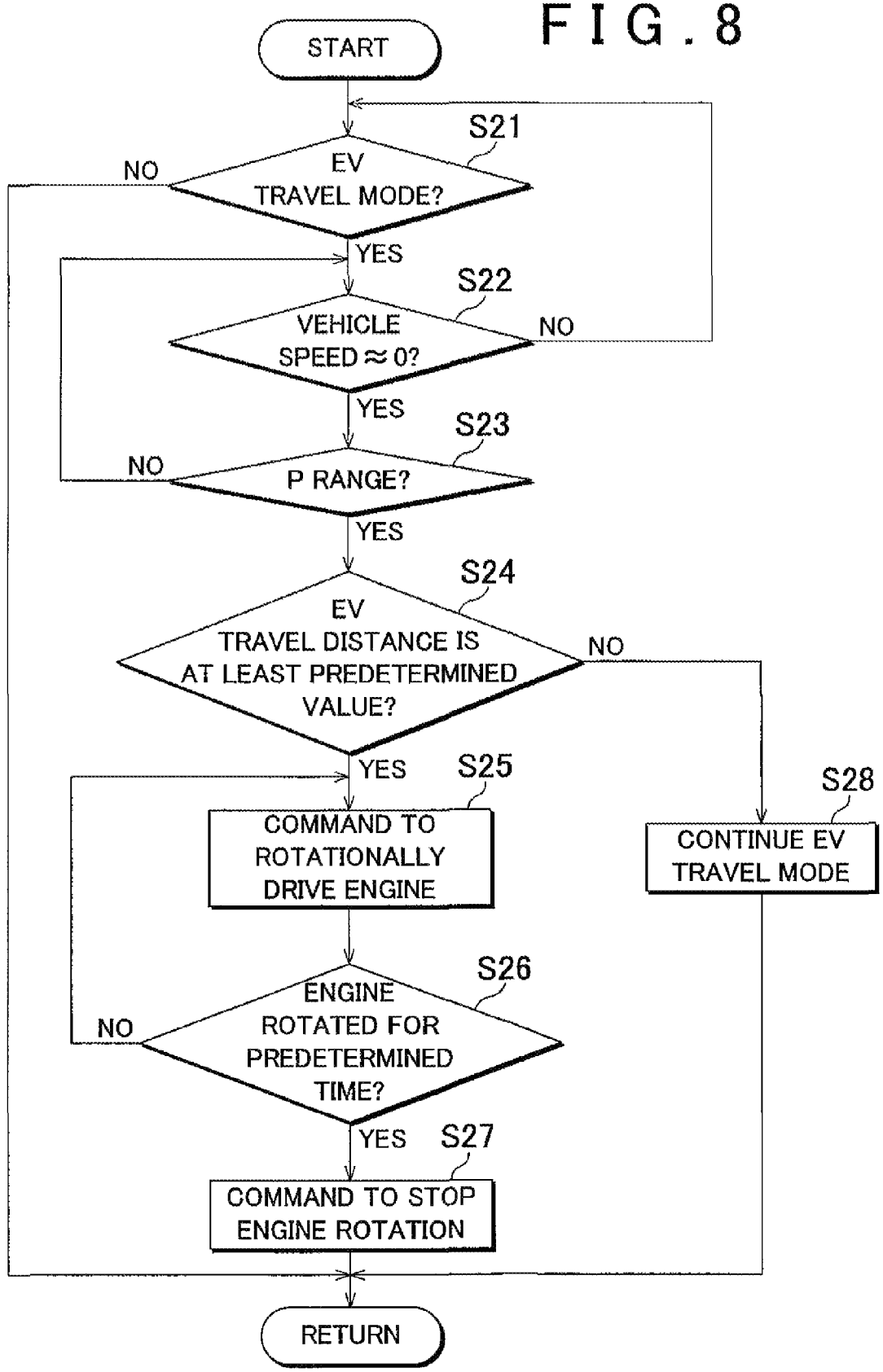
FIG. 8 is a flowchart illustrating a control operation of the electronic control unit shown in FIG. 3, that is, a control operation for supplying lubrication oil to various portions in the speed change mechanism by rotationally driving the engine at appropriate timing after stopping the rotational driving of the engine, and corresponds to the flowchart of FIG. 6 but shows a different embodiment.

FIG. 8 is a flowchart illustrating a portion of the control operations of the electronic control unit 80, that is, a control operation for supplying lubrication oil to various portions in the speed change mechanism 10 by rotationally driving the engine 14 at appropriate timing after stopping the rotational driving of the engine 14. The control operation of the flowchart is repeatedly executed in a very short cycle of about several msec to several ten msec. The flowchart of FIG. 8 corresponds to the flowchart of FIG. 6, but is a different embodiment.

In FIG. 8, firstly, in S21, which corresponds to the EV travel mode determination portion 86, it is determined whether or not the present vehicle state is the EV travel mode.

If a negative determination is made in S21, this routine is ended. If an affirmative determination is made in S21, the process proceeds to S22, which corresponds to the vehicle speed determination portion 88. In S22, it is determined whether or not the vehicle speed V is substantially zero, that is, in a predetermined vehicle speed range that allows the determination that the vehicle speed V is zero.

If a negative determination is made in S22, the process returns to S21. If an affirmative determination is made in S22, the process proceeds to S23, which corresponds to the shift position determination portion 96. In S23, the present position of the shift lever 52 is determined on the basis of the signal that represents the shift position $P_{SH}$ of the shift lever 52, and it is determined whether or not the position of the shift lever 52 is the "P" position.

If a negative determination is made in S23, the process returns to S22. If an affirmative determination is made in S23, the process proceeds to S24, which corresponds to the need-for-lubrication oil supply determining portion 92. In S24, it is determined whether or not the supply of lubrication oil by the oil pump 30 is necessary on the basis of whether or not the EV travel distance $L_{EV}$ has exceeded the predetermined distance L'.

If a negative determination is made in S24, the process proceeds to S28, which corresponds to the hybrid control portion 82. In S28, the setting of the EV travel mode is continued.

On the other hand, if an affirmative determination is made in S24, the process proceeds to S25, which corresponds to the rotational drive portion 84. In S25, the rotational-driving-of-engine command is output, so that the engine 14 is rotationally driven.

Next, in S26, which corresponds to the rotational driving time determination portion 94, it is determined whether or not the rotational driving time $T_{ED}$ of the engine 14 caused by S25 has reached the predetermined rotational driving time $T_{ED}'$.

If a negative determination is made in S26, the process returns to S25. If an affirmative determination is made in S26, the process proceeds to S27, which corresponds to the rotational drive portion 84. In S27, replacing the rotational-driving-of-engine command output in S25, an engine rotation stop command to stop the rotational driving of the engine 14 is output, so that the rotational driving of the engine 14 is stopped.

As described above, according to this embodiment, an effect is achieved as follows, in addition to achieving the effects of the foregoing embodiment. Since the engine 14 is rotationally driven during a stop of the vehicle during which the travel mode set by the rotational drive portion 84 is the EV travel, the influence of the torque fluctuation caused in association with the rotational driving of the engine 14, such as an uncomfortable shock or the like, can be restrained, so that the driveability improves.

A third embodiment of the invention will be described. In the forgoing embodiment, the rotational drive portion 84 determines whether or not the supply of lubrication oil to various portions in the speed change mechanism 10 by the oil pump 30 is necessary on the basis of the EV travel distance $L_{EV}$ following the stop of the rotational driving of the engine 14, and rotationally drives the engine 14 on the basis of the determination as to the need for the supply of lubrication oil. Instead of this operation, the rotational drive portion 84 in this embodiment determines whether or not the supply of lubrication oil to various portions in the speed change mechanism 10 by the oil pump 30 is necessary on the basis of the electric power amount stored in the electric storage device 56, for example, the charging capacity SOC, and rotationally drives the engine 14 on the basis of the determination as to the need for the supply of lubrication oil. That is, it is determined whether or not the supply of lubrication oil is necessary by also taking into account the EV travelable distance $L_{EVP}$ that the vehicle can travel in the EV travel mode and that is predicted from the charging capacity SOC of the electric storage device 56, and then the engine 14 is rotationally driven according to the determination.

Figure 9:
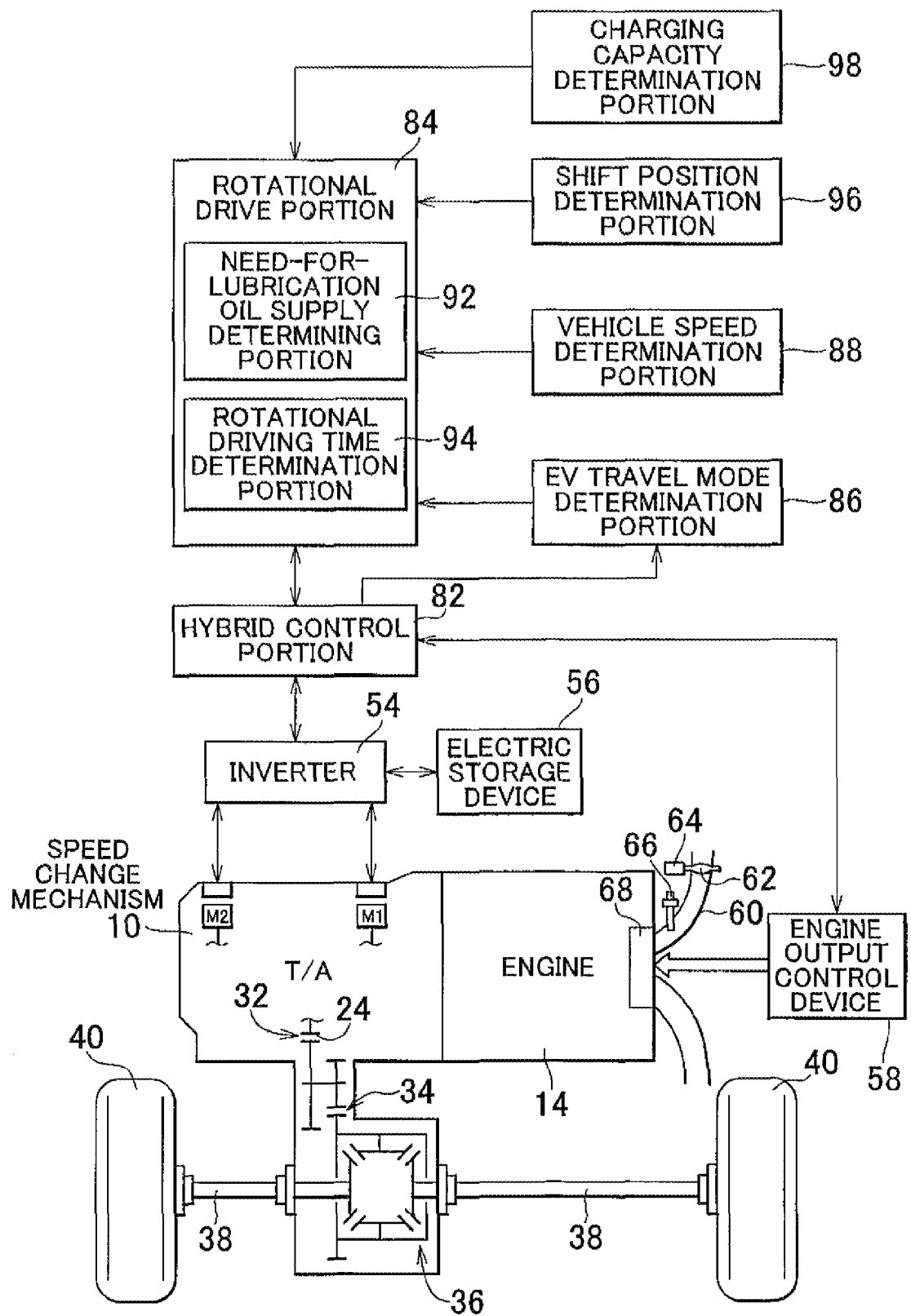
FIG. 9 is a functional block diagram illustrating portions of the control functions of the electronic control unit shown in FIG. 3, and corresponds to the functional block diagrams of FIGS. 5 and 7 but shows a different embodiment.

This will be concretely described with reference to FIG. 9. FIG. 9 is a functional block diagram illustrating portions of the control functions performed by the electronic control unit 80, and corresponds to FIGS. 5 and 7 but shows a different embodiment. In FIG. 9, a charging capacity determination portion 98 determines whether or not the charging capacity SOC of the electric storage device 56 is greater than or equal to a predetermined capacity SOC'. The predetermined capacity SOC' is a charging capacity criterion value that is empirically found and determined beforehand for determining whether or not it needs to be determined whether or not to determine whether or not the supply of lubrication oil is necessary by taking into account the EV travelable distance $L_{EVP}$, since it is predicted that, for example, if the charging capacity SOC of the electric storage device 56 is large, the EV travelable distance $L_{EVP}$ will be long.

If the EV travel mode determination portion 86 determines that the present vehicle state is the EV travel mode and the charging capacity determination portion 98 determines that the charging capacity SOC of the electric storage device 56 is greater than or equal to the predetermined capacity SOC', the need-for-lubrication oil supply determining portion 92 determines whether or not the supply of lubrication oil to various portions in the speed change mechanism 10 by the oil pump 30 is necessary on the basis of the charging capacity SOC, instead of performing the foregoing functions.

For example, the need-for-lubrication oil supply determining portion 92 calculates an EV travelable distance $L_{EVP}$ on the basis of an actual charging capacity SOC using a relationship between the charging capacity SOC of the electric storage device 56 and the EV travelable distance $L_{EVP}$ which is empirically found and determined beforehand (an EV travelable distance map), and determines whether or not the supply of lubrication oil by the oil pump 30 is necessary on the basis of whether or not a predicted EV travel distance $L_{EV+}$ obtained by adding the EV travelable distance $L_{EVP}$ to the accumulated EV travel distance, that is, the EV travel distance $L_{EV}$ has exceeded a predetermined distance L'.

Then, in the case where it is determined by the need-for-lubrication oil supply determining portion 92 that the supply of lubrication oil by the oil pump 30 is necessary since the predicted EV travel distance $L_{EV+}$ has exceeded the predetermined distance L', the rotational drive portion 84 outputs the rotational-driving-of-engine command to the hybrid control portion 82.

Figure 10:
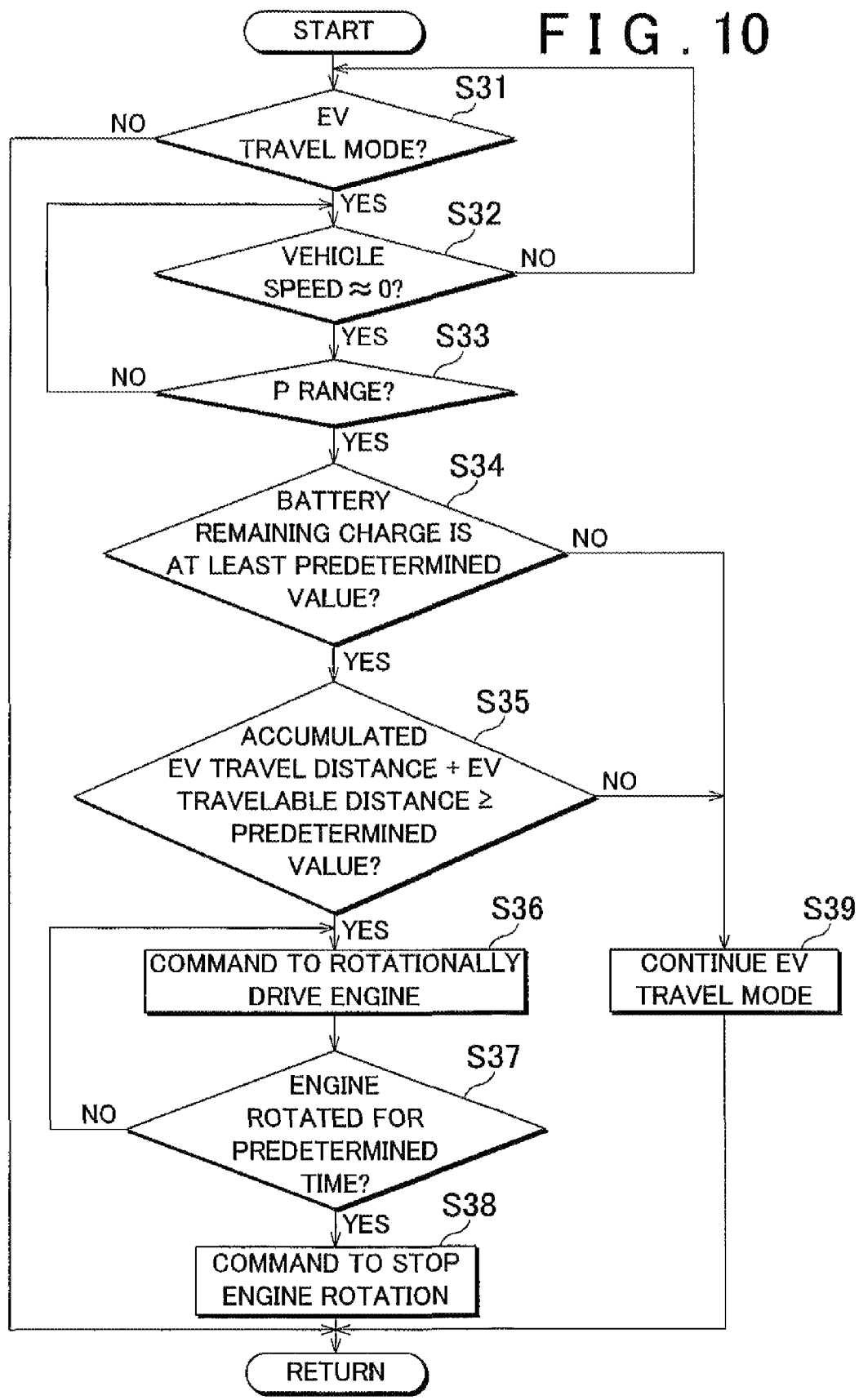
FIG. 10 is a flowchart illustrating a control operation of the electronic control unit shown in FIG. 3, that is, a control operation for supplying lubrication oil to various portions in the speed change mechanism by rotationally driving the engine at appropriate timing after stopping the rotational driving of the engine, and corresponds to the flowcharts of FIGS. 6 and 8 but shows a different embodiment.

FIG. 10 is a flowchart illustrating a portion of the control operations of the electronic control unit 80, that is, a control operation for supplying lubrication oil to various portions in the speed change mechanism 10 by rotationally driving the engine 14 at appropriate timing after stopping the rotational driving of the engine 14. The control operation of the flowchart is repeatedly executed in a very short cycle time of, for example, several msec to several ten msec. The flowchart of FIG. 10 corresponds to the flowcharts of FIGS. 6 and 8, but shows a different embodiment.

In FIG. 10, firstly, in S31, which corresponds to the EV travel mode determination portion 86, it is determined whether or not the present vehicle state is the EV travel mode.

If a negative determination is made in S31, this routine is ended. If an affirmative determination is made in S31, the process proceeds to S32, which corresponds to the vehicle speed determination portion 88. In S32, it is determined whether or not the vehicle speed V is substantially zero, that is, in a predetermined vehicle speed range that allows the determination that the vehicle speed V is zero.

If a negative determination is made in S32, the process returns to S31. If an affirmative determination is made in S32, the process proceeds to S33, which corresponds to the shift position determination portion 96. In S33, the present position of the shift lever 52 is determined on the basis of the signal that represents the shift position $P_{SH}$ of the shift lever 52, and it is determined whether or not the position of the shift lever 52 is the "P" position.

If a negative determination is made in S33, the process returns to S32. If an affirmative determination is made in S33, the process proceeds to S34, which corresponds to the charging capacity determination portion 98. In S34, it is determined whether or not the charging capacity SOC of the electric storage device 56 is the predetermined capacity SOC'.

If an affirmative determination is made in S34, the process proceeds to S35, which corresponds to the need-for-lubrication oil supply determining portion 92. In S35, for example, the EV travelable distance $L_{EVP}$ is calculated on the basis of the actual charging capacity SOC by using the EV travelable distance map, and it is determined whether or not the supply of lubrication oil by the oil pump 30 is necessary on the basis of whether or not the predicted EV travel distance $L_{EV+}$ that is the sum of the EV travelable distance $L_{EVP}$ and the accumulated EV travel distance $L_{EV}$ has exceeded the predetermined distance L'.

If a negative determination is made in S34 or a negative determination is made in S35, the process proceeds to S39, which corresponds to the hybrid control portion 82. In S39, the setting of the EV travel mode is continued.

On the other hand, if an affirmative determination is made in S35, the process proceeds to S36, which corresponds to the rotational drive portion 84. In S36, the rotational-driving-of-engine command is output, so that the engine 14 is rotationally driven.

Next, in S37, which corresponds to the rotational driving time determination portion 94, it is determined whether or not the rotational driving time $T_{ED}$ of the engine 14 caused by S36 has reached the predetermined rotational driving time $T_{ED}'$.

If a negative determination is made in S37, the process returns to S36. If an affirmative determination is made in S37, the process proceeds to S38, which corresponds to the rotational drive portion 84. In S38, replacing the rotational-driving-of-engine command output in S36, an engine rotation stop command to stop the rotational driving of the engine 14 is output, so that the rotational driving of the engine 14 is stopped.

As described above, according to this embodiment, the rotational drive portion 84 determines whether or not the supply of lubrication oil to various portions in the speed change mechanism 10 by the oil pump 30 is necessary on the basis of the charging capacity SOC of the electric storage device 56, and rotationally drives the engine 14 on the basis of the determination as to the need for the supply of lubrication oil. Therefore, the engine 14 can be rotationally driven at more appropriate timing to supply lubrication oil to various portions in the speed change mechanism 10 than in the case where the engine 14 is rotationally driven in a fixed fashion, for example, at the elapse of a predetermined time after the rotational driving of the engine 14 is stopped. This makes it possible to operate suitably also to the case where the EV travelable distance $L_{EVP}$ is long even if the time of stop of the rotational driving of the engine 14 is short or the EV travel distance $L_{EV}$ short, or the case where the EV travelable distance $L_{EVP}$ is short even if the EV travel distance $L_{EV}$ is long or the time of stop of the engine 14 is long, or the like. Therefore, the incidence of excessive or insufficient supply of lubrication oil to various portions in the speed change mechanism 10 will be restrained, and the fuel consumption efficiency will improve.

Furthermore, according to this embodiment, the rotational drive portion 84 predicts the EV travelable distance $L_{EVP}$ on the basis of the charging capacity SOC of the electric storage device 56. In the case where the predicted EV travel distance $L_{EV+}$ that is the sum of the EV travelable distance $L_{EVP}$ and the EV travel distance $L_{EV}$ exceeds the predetermined distance L', the rotational drive portion 84 determines that the supply of lubrication oil by the oil pump 30 is necessary, and rotationally drives the engine 14. Therefore, the engine 14 is rotationally driven in the case where the EV travelable distance $L_{EVP}$ is so long that the predicted EV travel distance $L_{EV+}$ exceeds the predetermined distance L' even if the time of stop of the rotational driving of the engine 14 is short or the EV travel distance $L_{EV}$ is short. On the other hand, the engine 14 is not rotationally driven in the case where the EV travelable distance $L_{EVP}$ is such that the predicted EV travel distance $L_{EV+}$ does not exceed the predetermined distance L' even if the time of stop of the engine 14 is long or the EV travel distance $L_{EV}$ is long. Hence, the incidence of excessive or insufficient supply of lubrication oil to various portions in the speed change mechanism 10 will be restrained.

A fourth embodiment of the invention will be described. In the foregoing embodiments, the rotational drive portion 84 determines whether or not the supply of lubrication oil to various portions in the speed change mechanism 10 by the oil pump 30 is necessary on the basis of the EV travel distance $L_{EV}$ following the stop of the rotational driving of the engine 14, or on the basis of the charging capacity SOC of the electric storage device 56, and rotationally drives the engine 14 on the basis of the determination as to the need for the supply of lubrication oil. However, this is not restrictive. For example, the engine 14 may also be rotationally driven during the stop of the vehicle during which the set travel mode is the EV travel mode, from the viewpoint of carrying out the supply of lubrication oil to various portions in the speed change mechanism 10 by the oil pump 30 in advance during the stop of the vehicle, regardless of the EV travel distance $L_{EV}$ or the charging capacity SOC of the electric storage device 56.

Figure 11:
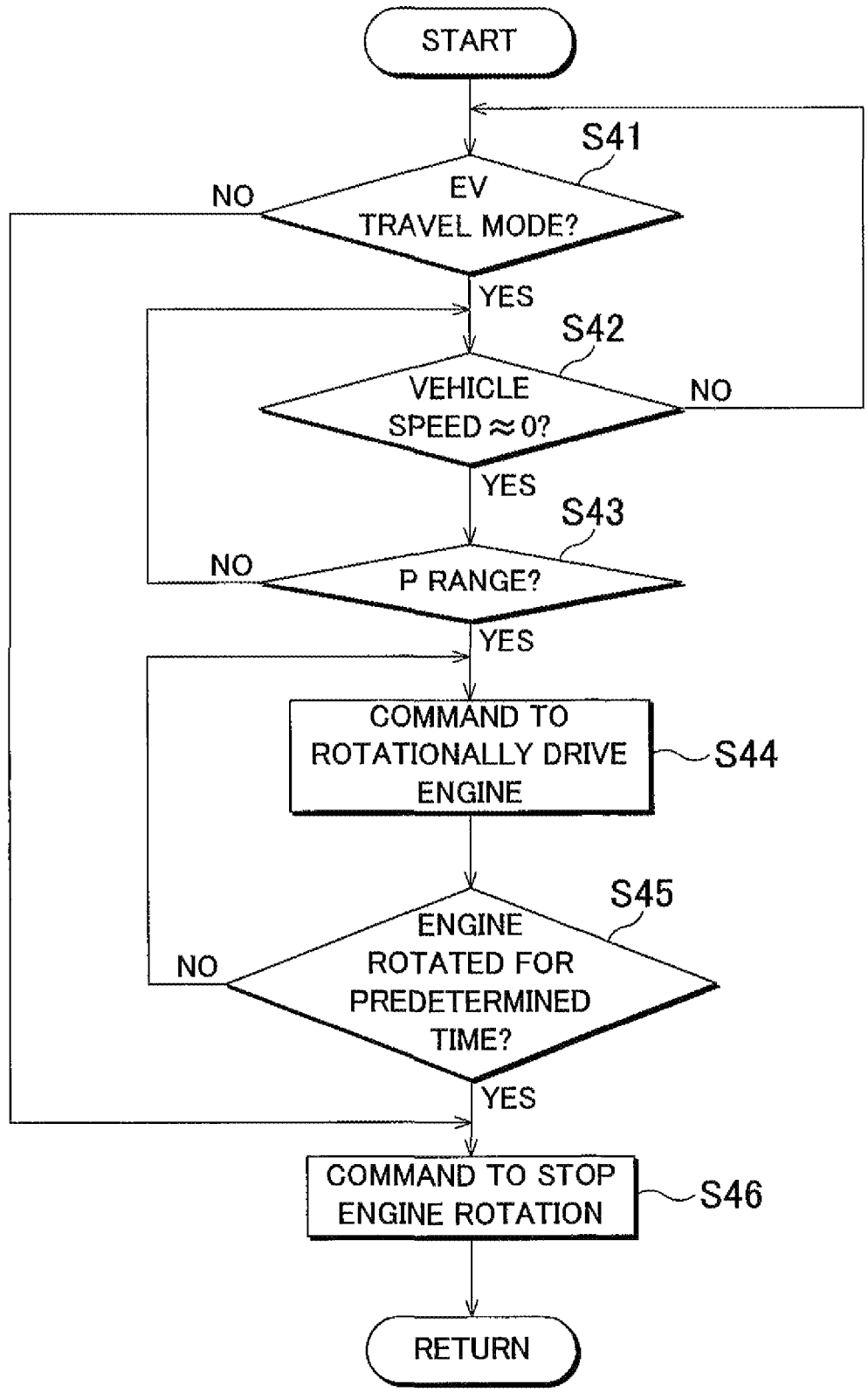
FIG. 11 is a flowchart illustrating a control operation of the electronic control unit shown in FIG. 3, that is, a control operation for supplying lubrication oil to various portions in the speed change mechanism by rotationally driving the engine in advance, and corresponds to the flowcharts of FIGS. 6, 8 and 10 but shows a different embodiment.

FIG. 11 is a flowchart illustrating a portion of the control operations of the electronic control unit 80, that is, a control operation for supplying lubrication oil to various portions in the speed change mechanism 10 by rotationally driving the engine 14 in advance. The operation of the flowchart is repeatedly executed in a very short cycle time of, for example, several msec to several ten msec. The flowchart of FIG. 11 corresponds to the flowcharts of FIGS. 6, 8 and 10, but shows a different embodiment.

In FIG. 11, firstly, in S41, which corresponds to the EV travel mode determination portion 86, it is determined whether or not the present vehicle state is the EV travel mode.

If a negative determination is made in S41, this routine is ended. If an affirmative determination is made in S41, the process proceeds to S42, which corresponds to the vehicle speed determination portion 88. In S42, it is determined whether or not the vehicle speed V is substantially zero, that is, in a predetermined vehicle speed range that allows the determination that the vehicle speed V is zero.

If a negative determination is made in S42, the process returns to S41. If an affirmative determination is made in S42, the process proceeds to S43, which corresponds to the shift position determination portion 96. In S43, the present position of the shift lever 52 is determined on the basis of the signal that represents the shift position $P_{SH}$ of the shift lever 52, and it is determined whether or not the position of the shift lever 52 is the "P" position.

If a negative determination is made in S43, the process returns to S42. If an affirmative determination is made in S43, the process proceeds to S44, which corresponds to the rotational drive portion 84. In S44, the rotational-driving-of-engine command is output, so that the engine 14 is rotationally driven.

Next, in S45, which corresponds to the rotational driving time determination portion 94, it is determined whether or not the rotational driving time $T_{ED}$ of the engine 14 caused by S44 has reached the predetermined rotational driving time $T_{ED}$'.

If a negative determination is made in S45, the process returns to S44. If an affirmative determination is made in S45, the process proceeds to S46, which corresponds to the rotational drive portion 84. In S46, replacing the rotational-driving-of-engine command output in S45, an engine rotation stop command to stop the rotational driving of the engine 14 is output, so that the rotational driving of the engine 14 is stopped.

As described above, according to this embodiment, since the engine 14 is rotationally driven in advance during the stop of the vehicle during which the travel mode set by the rotational drive portion 84 is the EV travel mode, the lubrication oil supplied to various portion in the speed change mechanism 10 by the oil pump 30 is secured, and the influence of the torque fluctuation caused in association with the rotational driving of the engine 14, such as an uncomfortable shock or the like, can be restrained, so that the driveability improves.

A fifth embodiment of the invention will be described. In the foregoing embodiment, the supply of lubrication oil to various portions in the speed change mechanism 10 by the oil pump 30 is executed by rotationally driving the engine 14 on the basis of various conditions when the EV travel mode has been set. In this embodiment, the supply of lubrication oil to various portions in the speed change mechanism 10 by the oil pump 30 is executed by rotationally driving the engine 14 when the system is started up to initiate a vehicle travel.

Figure 12:
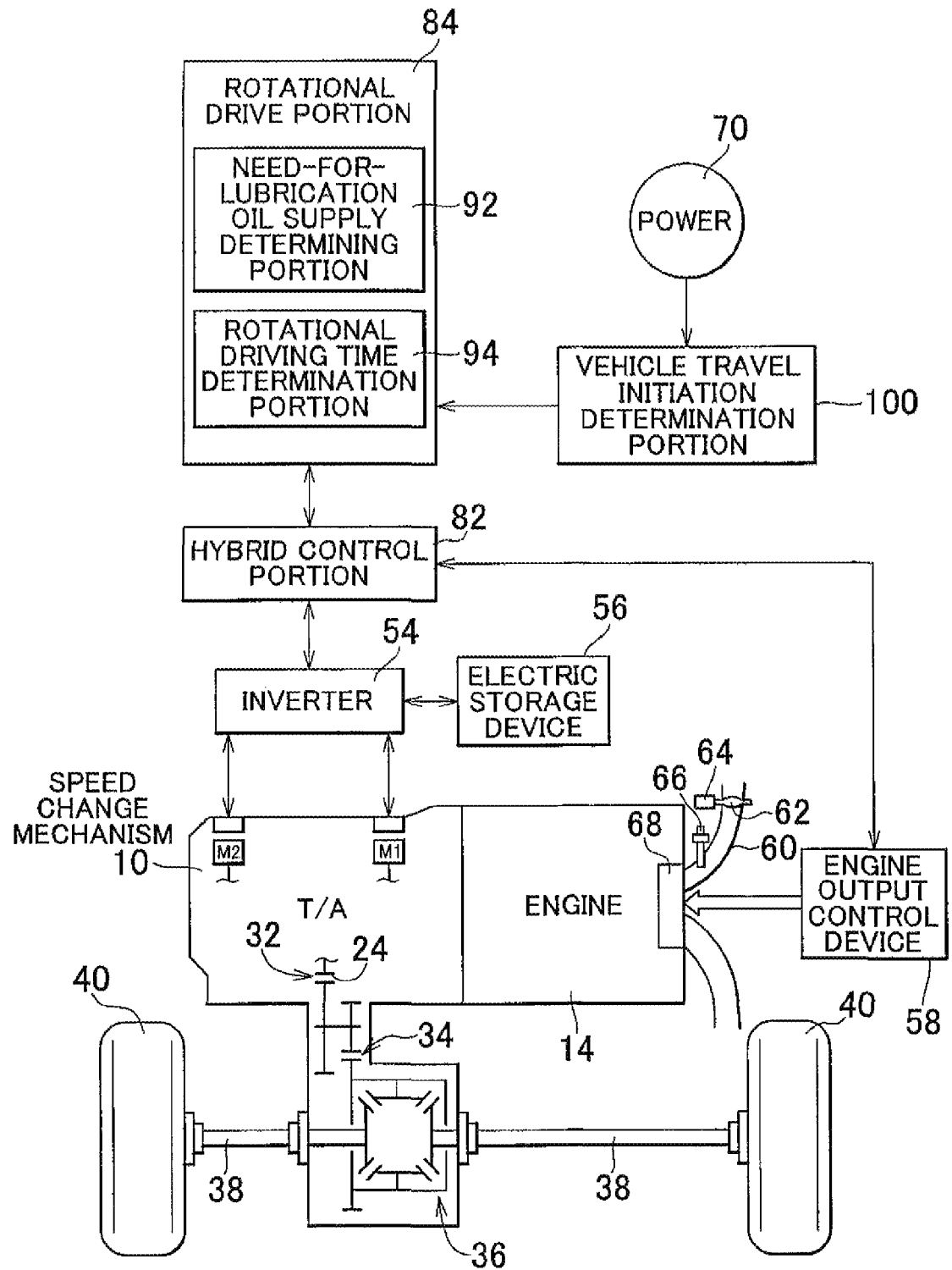
FIG. 12 is a functional block diagram illustrating portions of the control functions of the electronic control unit shown in FIG. 3, and corresponds to the functional block diagrams of FIGS. 5, 7 and 9 but shows a different embodiment.

This will be concretely described with reference to FIG. 12. FIG. 12 is a functional block diagram illustrating portions of the control functions performed by the electronic control unit 80, and corresponding to FIGS. 5, 7 and 9, but shows a different embodiment. In FIG. 12, a vehicle travel initiation determination portion 100 determines whether or not a vehicle travel initiating operation has been performed, that is, whether or not an operation of initiating a vehicle travel by a user has been performed, on the basis of, for example, whether or not a power switch 70 has been operated, with a brake pedal operated, after a turning-on operation of a key inserted in a key slot. The vehicle travel initiating operation herein means a commencement of the startup operation of a control device or a commencement of the system check of a control device or the like for establishing an able-to-travel state (ready-on state) (e.g., determination as to the presence/absence of an abnormality of a control device related to the hybrid control), and does not mean the time at which the vehicle makes a standing start from a stopped state of the vehicle such as a signal stop or the like.

The need-for-lubrication oil supply determining portion 92, instead of performing the foregoing functions, determines whether or not the supply of lubrication oil to various portions in the speed change mechanism 10 by the oil pump 30 is necessary on the basis of the accumulated EV travel distance $L_{EV}$ from the previous travel, when it is determined by the vehicle travel initiation determination portion 100 that an operation for vehicle travel initiation by a user has been performed.

Figure 13:
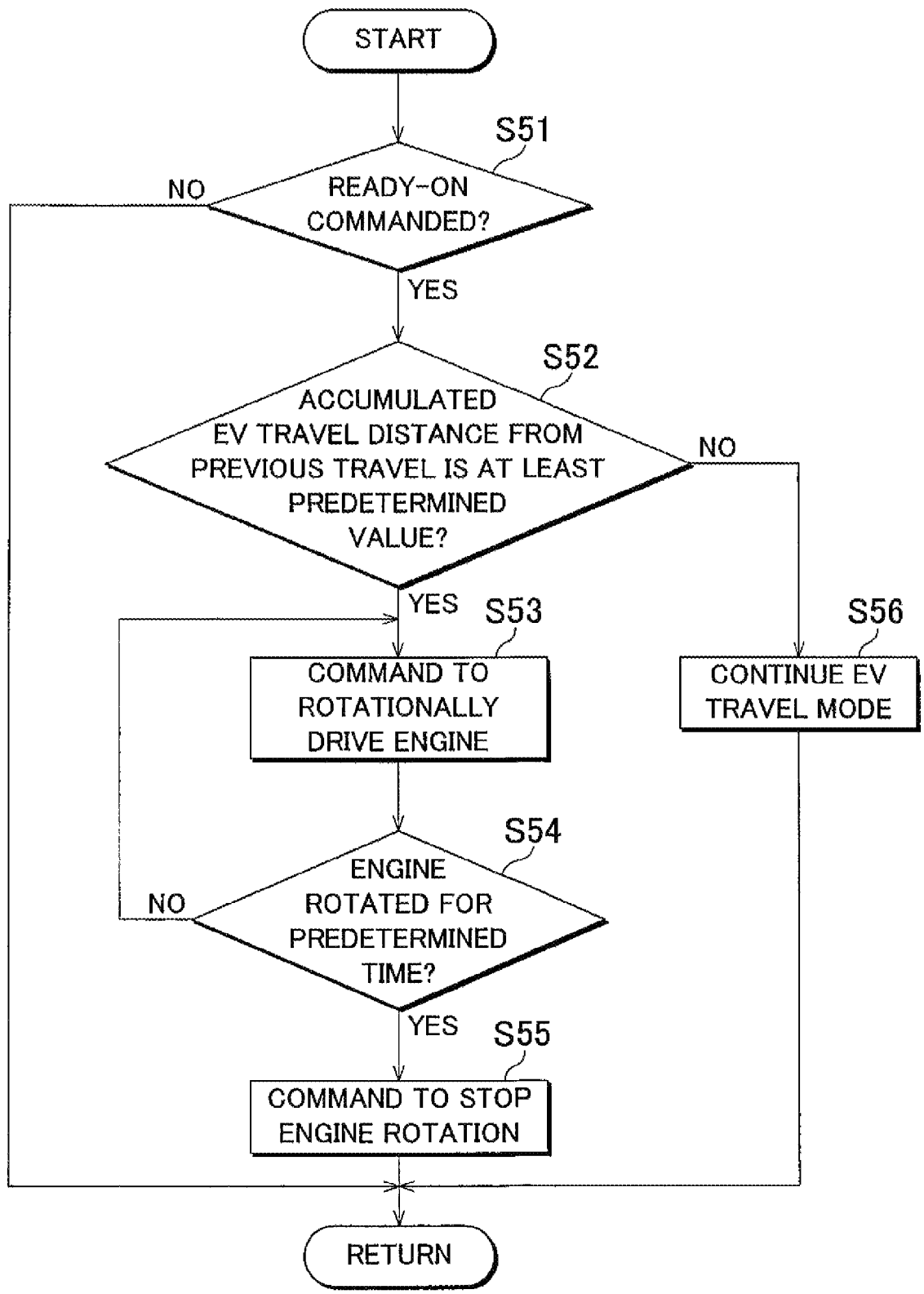
FIG. 13 is a flowchart illustrating a control operation of the electronic control unit shown in FIG. 3, that is, a control operation for supplying lubrication oil to various portions in the speed change mechanism by rotationally driving the engine when the system is started up for vehicle travel initiation, and corresponds to the flowcharts of FIGS. 6, 8, 10 and 11 but shows a different embodiment.

FIG. 13 is a flowchart illustrating a portion of the control operations of the electronic control unit 80, that is, a control operation for supplying lubrication oil to various portions in the speed change mechanism 10 by rotationally driving the engine 14 when the system is started up for vehicle travel initiation. The operation of the flowchart is repeatedly executed in a very short cycle time of, for example, several msec to several ten msec. The flowchart of the FIG. 13 corresponds to the flowcharts of FIGS. 6, 8, 10 and 11, but shows a different embodiment.

In FIG. 13, firstly, in S51, which corresponds to the vehicle travel initiation determination portion 100, it is determined whether or not an operation for vehicle travel initiation by a user has been performed, for example, whether or not a command to establish a ready-on state has been output, on the basis of, for example, whether or not the power switch 70 has been operated, with the brake pedal operated, after the turning-on operation of the key inserted in the key slot.

If a negative determination is made in S51, this routine is ended. If an affirmative determination is made in S51, the process proceeds to S52, which corresponds to the need-for-lubrication oil supply determining portion 92. In S52, it is determined whether or not the supply of lubrication oil by the oil pump 30 is necessary on the basis of whether or not the accumulated EV travel distance $L_{EV}$ from the previous travel has exceeded a predetermined distance L'.

If a negative determination is made in S52, the process proceeds to S56, which corresponds to the hybrid control portion 82. In S56, the setting of the EV travel mode is continued.

On the other hand, if an affirmative determination is made in S52, the process proceeds to S53, which corresponds to the rotational drive portion 84. In S53, the rotational-driving-of-engine command is output, so that the engine 14 is rotationally driven.

Next, in S54, which corresponds to the rotational driving time determination portion 94, it is determined whether or not the rotational driving time $T_{ED}$ of the engine 14 caused by S53 has reached a predetermined rotational driving time $T_{ED}'$.

If a negative determination is made in S54, the process returns to S53. If an affirmative determination is made in S54, the process proceeds to S55, which corresponds to the rotational drive portion 84. In S55, replacing the rotational-driving-of-engine command output in S53, an engine rotation stop command to stop the rotational driving of the engine 14 is output, so that the rotational driving of the engine 14 is stopped.

As described above, according to this embodiment, the rotational drive portion 84 determines whether or not the supply of lubrication oil to various portions in the speed change mechanism 10 by the oil pump 30 is necessary on the basis of the accumulated EV travel distance $L_{EV}$ from the previous travel when a operation for vehicle travel initiation by a user is performed, and then rotationally drives the engine 14 on the basis of the determination as to the need for the supply of lubrication. Therefore, the engine 14 can be rotationally driven at appropriate timing to supply lubrication oil to various portions in the speed change mechanism 10.

A sixth embodiment of the invention will be described. In the foregoing fifth embodiment, the rotational drive portion 84 determines whether or not the supply of lubrication oil to various portions in the speed change mechanism 10 by the oil pump 30 is necessary on the basis of the accumulated EV travel distance $L_{EV}$ from the previous travel when an operation for vehicle travel initiation by a user is performed, and then rotationally drives the engine 14 on the basis of the determination as to the need for the supply of lubrication oil. Instead of that operation, the rotational drive portion 84 in this embodiment determines whether or not the supply of lubrication oil to various portions in the speed change mechanism 10 by the oil pump 30 is necessary on the basis of the charging capacity SOC of the electric storage device 56 when an operation for vehicle travel initiation by a user is performed, and then rotationally drives the engine 14 on the basis of the determination as to the need for the supply of lubrication oil.

Figure 14:
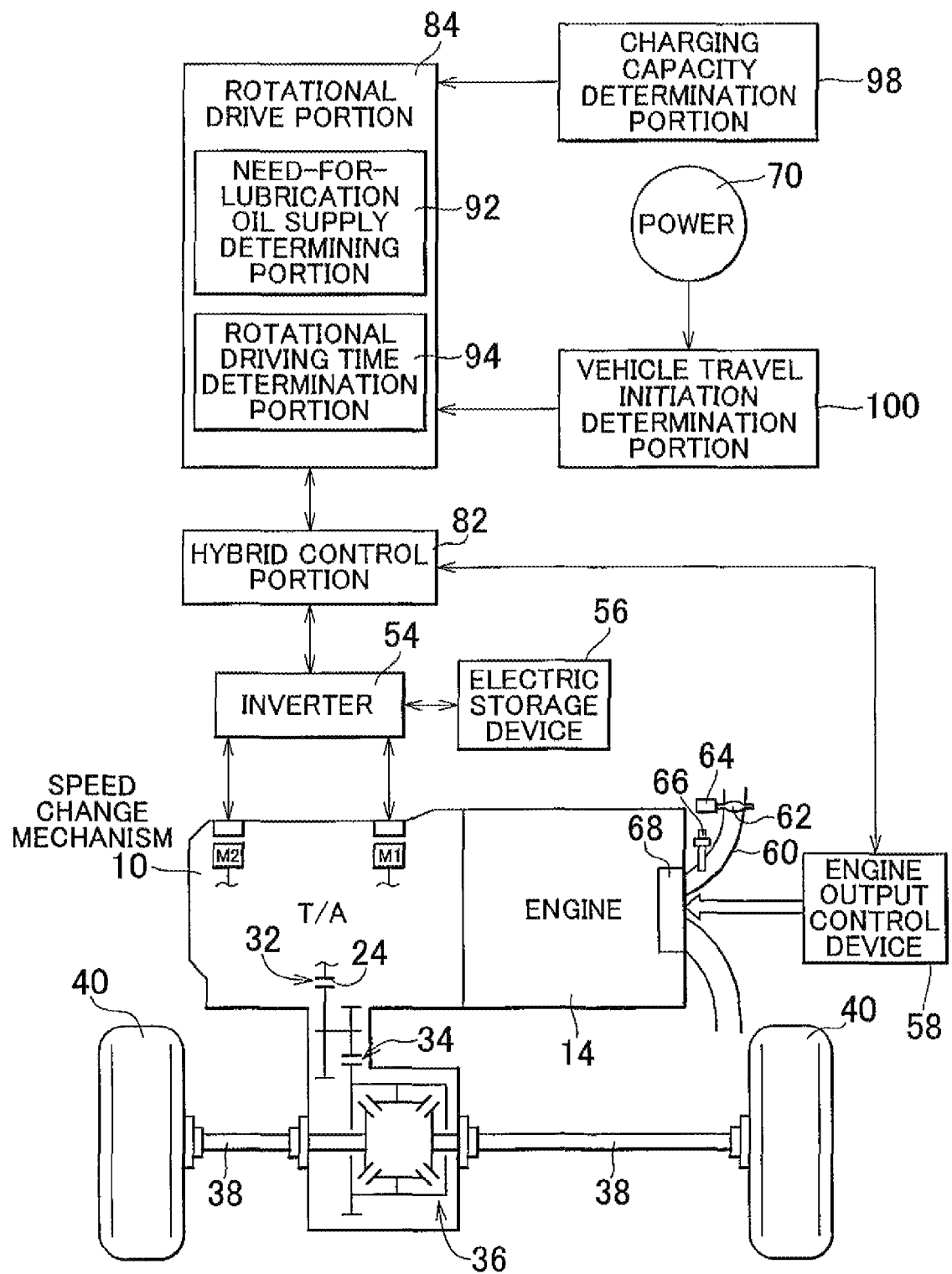
FIG. 14 is a functional block diagram illustrating portions of the control functions of the electronic control unit shown in FIG. 3, and corresponds to the functional block diagrams of FIGS. 5, 7, 9 and 12 but shows a different embodiment.

This will be concretely described with reference to FIG. 14. FIG. 14 is a functional block diagram illustrating portions of the control functions performed by the electronic control unit 80, and corresponds to FIGS. 5, 7, 9 and 12, but shows a different embodiment.

In FIG. 14, the need-for-lubrication oil supply determining portion 92 performs a function as follows, instead of the foregoing functions. That is, when it is determined by the vehicle travel initiation determination portion 100 that an operation for vehicle travel initiation by a user has been performed and it is determined by the charging capacity determination portion 98 that the charging capacity SOC of the electric storage device 56 is greater than or equal to a predetermined capacity SOC', the need-for-lubrication oil supply determining portion 92 determines whether or not the supply of lubrication oil to various portions in the speed change mechanism 10 by the oil pump 30 is necessary on the basis of the charging capacity SOC.

Figure 15:
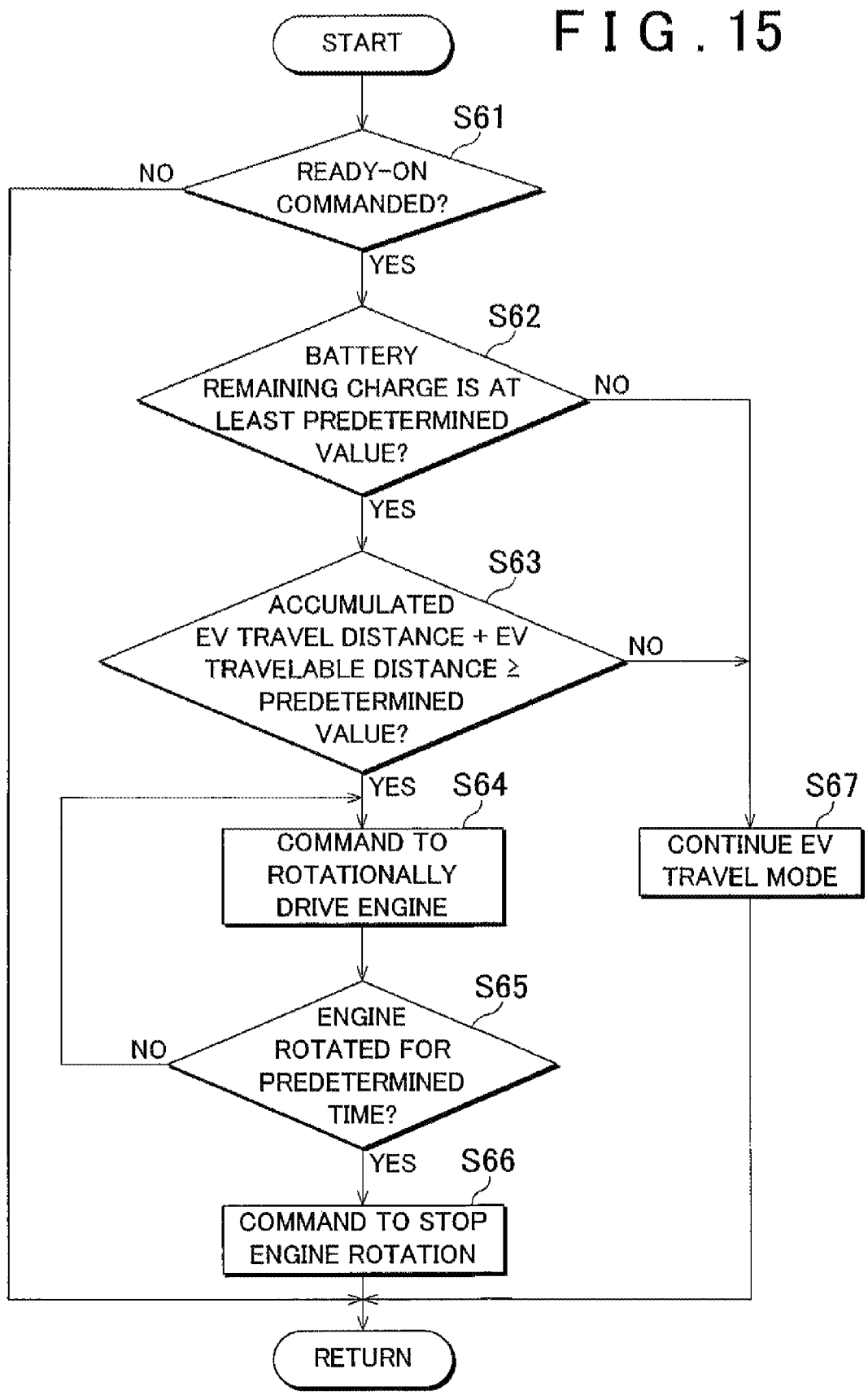
FIG. 15 is a flowchart illustrating a control operation of the electronic control unit shown in FIG. 3, that is, a control operation for supplying lubrication oil to various portions in the speed change mechanism by rotationally driving the engine when the system is started up for vehicle travel initiation, and corresponds to the flowcharts of FIGS. 6, 8, 10, 11 and 13 but shows a different embodiment.

FIG. 15 is a flowchart illustrating a portion of the control operations of the electronic control unit 80, that is, a control operation for supplying lubrication oil to various portions in the speed change mechanism 10 by rotationally driving the engine 14 when the system is started up for vehicle travel initiation. The operation of the flowchart is repeatedly executed in a very short cycle time of, for example, several msec to several ten msec. The flowchart of FIG. 15 corresponds to the flowcharts of FIGS. 6, 8, 10, 11 and 13, but shows a different embodiment.

In FIG. 15, firstly in S61, which corresponds to the vehicle travel initiation determination portion 100, it is determined whether or not an operation for vehicle travel initiation by a user has been performed, for example, whether or not a command to establish a ready-on state has been output.

If a negative determination is made in S61, this routine is ended. If an affirmative determination is made in S61, the process proceeds to S62, which corresponds to the charging capacity determination portion 98. In S62, it is determined whether or not the charging capacity SOC of the electric storage device 56 is greater than or equal to the predetermined capacity SOC'.

If an affirmative determination is made in S62, the process proceeds to S63, which corresponds to the need-for-lubrication oil supply determining portion 92. In S63, an EV travelable distance $L_{EVP}$ is calculated on the basis of the actual charging capacity SOC by, for example, using an EV travelable distance map, and it is determined whether or not the supply of lubrication oil by the oil pump 30 is necessary on the basis of whether or not a predicted EV travel distance $L_{EV+}$ that is the sum of the EV travelable distance $L_{EVP}$ and the accumulated EV travel distance $L_{EV}$ has exceeded a predetermined distance L'.

If a negative determination is made in S62 or if a negative determination is made in S63, the process proceeds to S67, which corresponds to the hybrid control portion 82. In S67, the setting of the EV travel mode is continued.

On the other hand, if an affirmative determination is made in S63, the process proceeds to S64, which corresponds to the rotational drive portion 84. In S64, the rotational-driving-of-engine command is output, so that the engine 14 is rotationally driven.

Next, in S65, which corresponds to the rotational driving time determination portion 94, it is determined whether or not the rotational driving time $T_{ED}$ of the engine 14 caused by the S64 has reached a predetermined rotational driving time $T_{ED}'$.

If a negative determination is made in S65, the process returns to S64. If an affirmative determination is made in S65, the process proceeds to S66, which corresponds to the rotational drive portion 84. In S66, replacing the rotational-driving-of-engine command output in S64, an engine rotation stop command to stop the rotational driving of the engine 14 is output, so that the rotational driving of the engine 14 is stopped.

As described above, according to this embodiment, the rotational drive portion 84 determines whether or not the supply of lubrication oil to various portions in the speed change mechanism 10 by the oil pump 30 is necessary on the basis of the charging capacity SOC of the electric storage device 56 when an operation for vehicle travel initiation by a user is performed, and then rotationally drives the engine 14 on the basis of the determination as to the need for the supply of lubrication oil. Therefore, the engine 14 can be rotationally driven at appropriate timing to supply lubrication oil to various portions in the speed change mechanism 10.

A seventh embodiment of the invention will be described. In the foregoing fifth and sixth embodiments, the rotational drive portion 84 determines whether or not the supply of lubrication oil to various portions in the speed change mechanism 10 by the oil pump 30 is necessary on the basis of the EV travel distance $L_{EV}$ or the charging capacity SOC of the electric storage device 56 when an operation for vehicle travel initiation by a user is performed, and then rotationally drives the engine 14 on the basis of the determination as to the need for the supply of lubrication oil. However, the engine 14 may also be rotationally driven from the viewpoint of carrying out the supply of lubrication oil to various portions in the speed change mechanism 10 by the oil pump 30 in advance when an operation for vehicle travel initiation by a user is performed, that is, when the system of the vehicle is started, regardless of the EV travel distance $L_{EV}$ or the charging capacity SOC of the electric storage device 56.

Figure 16:
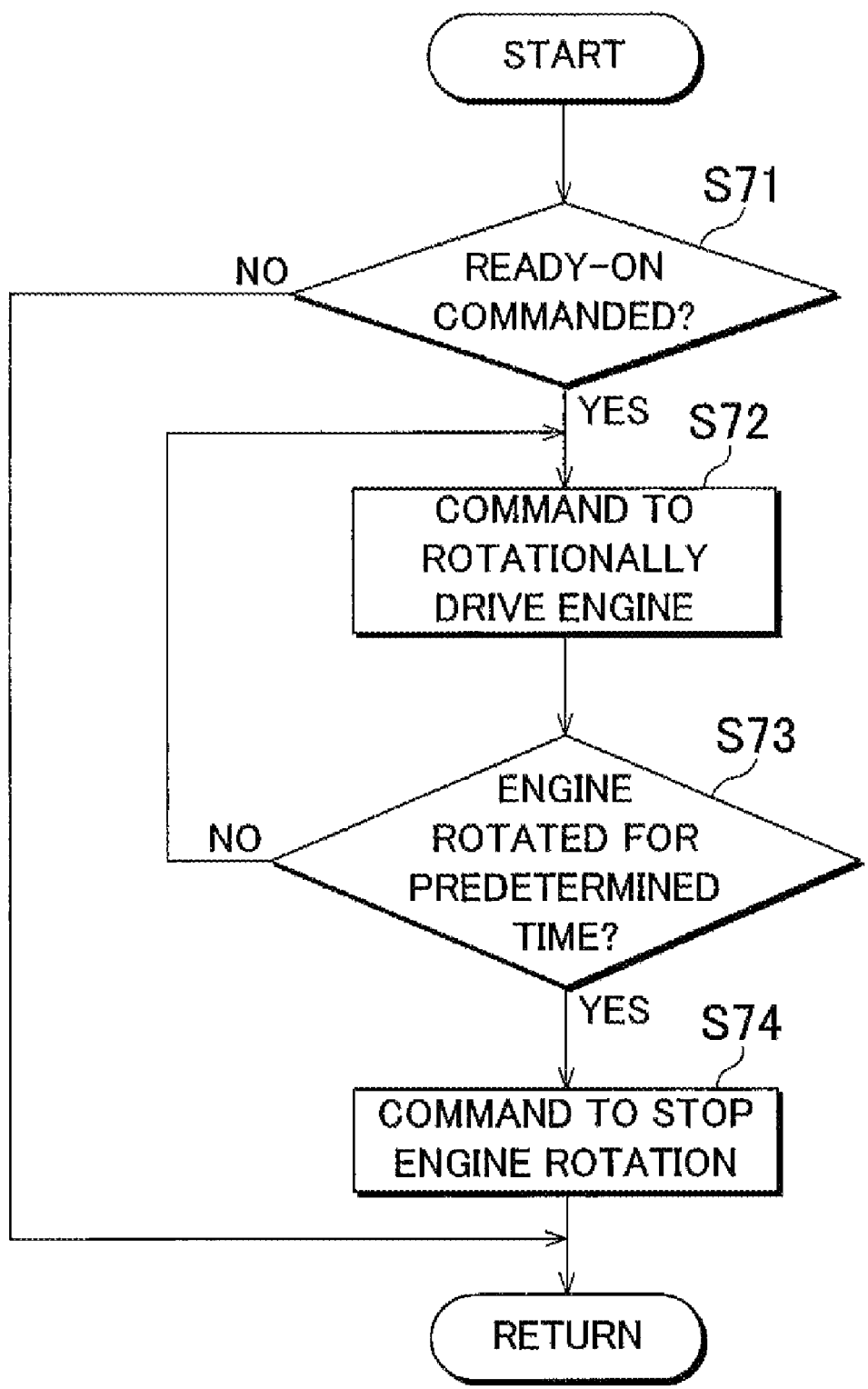
FIG. 16 is a flowchart illustrating a control operation of the electronic control unit shown in FIG. 3, that is, a control operation for supplying lubrication oil to various portions in the speed change mechanism by rotationally driving the engine in advance, and corresponds to the flowcharts of FIGS. 6, 8, 10, 11, 13 and 15 but shows a different embodiment.

FIG. 16 is a flowchart illustrating a portion of the control operations of the electronic control unit 80, that is, a control operation for supplying lubrication oil to various portions in the speed change mechanism 10 by rotationally driving the engine 14 in advance. The operation of the flowchart is repeatedly executed in a very short cycle time of, for example, several msec to several ten msec. The flowchart of FIG. 16 corresponds to the flowcharts of FIGS. 6, 8, 10, 11, 13 and 15, but shows a different embodiment.

In FIG. 16, firstly in S71, which corresponds to the vehicle travel initiation determination portion 100, it is determined whether or not an operation for vehicle travel initiation by a user has been performed, for example, whether or not a command to establish a ready-on state has been output.

If a negative determination is made in S71, this routine is ended. If an affirmative determination is made in S71, the process proceeds to S72, which corresponds to the rotational drive portion 84. In S72, the rotational-driving-of-engine command is output, so that the engine 14 is rotationally driven.

Next, in S73, which corresponds to the rotational driving time determination portion 94, it is determined whether or not the rotational driving time $T_{ED}$ of the engine 14 caused by S72 has reached a predetermined rotational driving time $T_{ED}'$.

If a negative determination is made in S73, the process returns to S72. If an affirmative determination is made in S73, the process proceeds to S74, which corresponds to the rotational drive portion 84. In S74, replacing the rotational-driving-of-engine command output in S72, an engine rotation stop command to stop the rotational driving of the engine 14 is output, so that the rotational driving of the engine 14 is stopped.

As described above, according to this embodiment, the rotational drive portion 84 rotationally drives the engine 14 in advance when an operation for vehicle travel initiation by a user is performed. Therefore, the lubrication oil supplied to various portions in the speed change mechanism 10 by the oil pump 30 can be secured, and the influence of the torque fluctuation caused in association with the rotational driving of the engine 14, such as an uncomfortable shock or the like, can be restrained, so that the driveability improves.

While embodiments of the invention have been described in detail with reference to the drawings, the invention can also be carried out in combinations of the forgoing embodiments, and may also be applied in other forms.

For example, in the third and sixth embodiments, in the case where the predicted EV travel distance $L_{EV+}$ that is the sum of the EV travelable distance $L_{EVP}$ and the EV travel distance $L_{EV}$ exceeds the predetermined distance L', the rotational drive portion 84 determines whether or not the supply of lubrication oil by the oil pump 30 is necessary, and rotationally drives the engine 14. However, this is not restrictive. For example, in the case where the EV travelable distance $L_{EVP}$ exceeds the predetermined distance L', it may be determined that the supply of lubrication oil by the oil pump 30 is necessary, and the engine 14 may be rotationally driven. In this manner, too, the engine 14 is rotationally driven in the case where the EV travelable distance $L_{EVP}$ exceeds the predetermined distance L' even if the time of stop of the rotational driving of the engine 14 short or the EV travel distance $L_{EV}$ is short. On the other hand, the engine 14 is not rotationally driven in the case where the EV travelable distance $L_{EVP}$ does not exceed the predetermined distance L' even if the time of stop of the engine 14 is long or the EV travel distance $L_{EV}$ is long. As a result a certain effect of restraining the incidence of excessive or insufficient supply of lubrication oil to various portions in the speed change mechanism 10 can be achieved.

Furthermore, in conjunction with the foregoing embodiments, the speed change mechanism 10 is shown as an example of a power transmission device. It suffices that this power transmission device be constructed so as to be capable of the EV travel even if operation oil is not supplied. For example, the invention is applicable even to a construction that includes a well-known manual transmission, and also an engine and an electric motor as drive force sources.

Furthermore, in the foregoing embodiments, the speed change mechanism 10 includes the first planetary gear device 20 as a differential mechanism. In place of the first planetary gear device 20, a differential gear device that includes, for example, pinions that are rotationally driven by the engine 14, and a pair of bevel gears that are in mesh with the pinions and that are operatively linked to the first electric motor M1 and the output gear 24 may be provided as a differential mechanism.

Still further, in conjunction with the foregoing embodiments, the oil pump 30 connected concentrically to the output shaft of the engine 14 via the input shaft 18 and the damper 16 is shown as an example of the lubrication oil supply device. However, it suffices that the lubrication oil supply device be provided so as to be able to supply lubrication oil to various portions in the speed change mechanism 10 due to the rotational driving of the engine 14. For example, the lubrication oil supply device may also be an oil pump that is operatively linked to the engine 14 via a belt or a gear, or the like.

Still further, in conjunction with the foregoing embodiments, the first electric motor M1 operatively linked to the engine 14 via the first planetary gear device 20 is shown as an example of the driving device that is operatively linked to the engine 14. However, it suffices that the driving device be able to rotationally drive the engine 14. For example, the driving device may also be an electric motor that is operatively linked to the engine 14 directly or via a belt or a gear (e.g., a well-known engine starting device (starter)), or the like.

What have been described above are mere embodiments. The invention can be carried out in various forms with modifications and improvements on the basis of the knowledge of people of ordinary skill in the art.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A control device for a hybrid vehicle driving device that includes:
    an internal combustion engine and an electric motor as drive force sources;
    a power transmission device that transmits power of the drive force sources to a driving wheel;
    an electric storage device that supplies stored electric power to the electric motor; and
    a lubrication oil supply device that is operatively linked to the internal combustion engine and that supplies lubrication oil to at least a portion of the power transmission device due to rotational driving of the internal combustion engine, wherein the hybrid vehicle driving device is capable of causing a motor-powered travel of a hybrid vehicle in which only the electric motor is used as a drive force source, by driving the electric motor with electric power from the electric storage device while the rotational driving of the internal combustion engine has been stopped, comprising a rotational drive portion that determines whether or not supply of the lubrication oil to at least a portion of the power transmission device by the lubrication oil supply device is necessary based on a travel distance in the motor-powered travel following a stop of the rotational driving of the internal combustion engine, and rotationally drives the internal combustion engine based on determination as to need for the supply of the lubrication oil, wherein the rotational drive portion rotationally drives the internal combustion engine by starting the internal combustion engine.

2. The control device for a hybrid vehicle driving device according to claim 1, wherein the rotational drive portion determines that the supply of the lubrication oil by the lubrication oil supply device is necessary, and rotationally drives the internal combustion engine if the travel distance in the motor-powered travel exceeds a predetermined distance.

3. The control device for a hybrid vehicle driving device according to claim 1, wherein:
    the hybrid vehicle driving device further includes a driving device that is operatively linked to the internal combustion engine; and
    the rotational drive portion rotationally drives the internal combustion engine via the driving device.

4. The control device for a hybrid vehicle driving device according to claim 1, wherein the rotational drive portion rotationally drives the internal combustion engine when the hybrid vehicle is in a substantially stopped state.

5. The control device for a hybrid vehicle driving device according to claim 1, wherein the rotational drive portion stops the rotational driving of the internal combustion engine if a length of time of rotationally driving the internal combustion engine exceeds a predetermined time.

6. The control device for a hybrid vehicle driving device according to claim 5, wherein the predetermined time is a time that allows the lubrication oil to be delivered to at least a portion of the power transmission device by the supply of the lubrication oil.

7. A control device for a hybrid vehicle driving device, that includes:
    an internal combustion engine and an electric motor as drive force sources;
    a power transmission device that transmits power of the drive force sources to a driving wheel;
    an electric storage device that supplies stored elect power to the electric motor; and
    a lubrication oil supply device that is operatively linked to the internal combustion engine and that supplies lubrication oil to at least a portion of the power transmission device due to rotational driving of the internal combustion engine, wherein the hybrid vehicle driving device is capable of causing a motor-powered travel of a hybrid vehicle in which only the electric motor is used as a drive force source, by driving the electric motor with electric power from the electric storage device while the rotational driving of the internal combustion engine has been stopped, comprising a rotational drive portion that determines whether or not supply of the lubrication oil to at least a portion of the power transmission device by the lubrication oil supply device is necessary based on a travel distance in the motor-powered travel following a stop of the rotational driving of the internal combustion engine, and rotationally drives the internal combustion engine based on determination as to need for the supply of the lubrication oil; and
    a vehicle travel initiation determination portion that detects whether a vehicle travel initiating operation has been performed in a hybrid vehicle, wherein the rotational drive portion rotationally drives the internal combustion engine based on a result of detection of the vehicle travel initiation determination portion.

8. A control device for a hybrid vehicle driving device that includes:
    an internal combustion engine and an electric motor as drive force sources;
    a power transmission device that transmits power of the drive force sources to a driving wheel;
    an electric storage device that supplies stored electric power to the electric motor; and
    a lubrication oil supply device that is operatively linked to the internal combustion engine and that supplies lubrication oil to at least a portion of the power transmission device due to rotational driving of the internal combustion engine, wherein the hybrid vehicle driving device is capable of causing a motor-powered travel of a hybrid vehicle in which only the electric motor is used as a drive force source, by driving the electric motor with electric power from the electric storage device while the rotational driving of the internal combustion engine has been stopped, comprising a rotational drive portion that determines whether or not supply of the lubrication oil to at least a portion of the power transmission device by the lubrication oil supply device is necessary based on an electric power amount stored in the electric storage device, and rotationally drives the internal combustion engine based on determination as to need for the supply of the lubrication oil.

9. The control device for a hybrid vehicle driving device according to claim 8, wherein:
    the rotational drive portion predicts a travelable distance over which the motor-powered travel is feasible based on the electric power amount stored in the electric storage device; and
    if the travelable distance exceeds a predetermined distance, the rotational drive portion determines that the supply of the lubrication oil by the lubrication oil supply device is necessary, and rotationally drives the internal combustion engine.

10. The control device for a hybrid vehicle driving device according to claim 8, wherein:
    the rotational drive portion predicts a travelable distance over which the motor-powered travel is feasible based on the electric power amount stored in the electric storage device; and the rotational drive portion determines that the supply of lubrication oil by the lubrication oil supply device is necessary and rotationally drives the internal combustion engine, if a sum of the travelable distance and a travel distance in the motor-powered travel following a stop of the rotational driving of the internal combustion engine exceeds a predetermined distance.

11. The control device for a hybrid vehicle driving device according to claim 8, wherein the rotational drive portion rotationally drives the internal combustion engine by starting the internal combustion engine.

12. The control device for a hybrid vehicle driving device according to claim 8, wherein:
the hybrid vehicle driving device further includes a driving device that is operatively linked to the internal combustion engine; and
the rotational drive portion rotationally drives the internal combustion engine via the driving device.

13. The control device for a hybrid vehicle driving device according to claim 8, wherein the rotational drive portion rotationally drives the internal combustion engine when the hybrid vehicle is in a substantially stopped state.

14. The control device for a hybrid vehicle driving device according to claim 8, wherein the rotational drive portion stops the rotational driving of the internal combustion engine if a length of time of rotationally driving the internal combustion engine exceeds a predetermined time.

15. The control device for a hybrid vehicle driving device according to claim 14, wherein the predetermined time is a time that allows the lubrication oil to be delivered to at least a portion of the power transmission device by the supply of the lubrication oil.

16. The control device for a hybrid vehicle driving device according to claim 8, further comprising a vehicle travel initiation determination portion that detects whether a vehicle travel initiating operation has been performed in the hybrid vehicle,
wherein the rotational drive portion rotationally drives the internal combustion engine based on a result of detection of the vehicle travel initiation determination portion.

17. A control device for a hybrid vehicle driving device that includes:
an internal combustion engine and an electric motor as drive force sources;
power transmission means for transmitting power of the drive force sources to a driving wheel;
electric storage means for supplying stored electric power to the electric motor; and
lubrication oil supply means operatively linked to the internal combustion engine for supplying lubrication oil to at least a portion of the power transmission means due to rotational driving of the internal combustion engine,
wherein the hybrid vehicle driving device is capable of causing a motor-powered travel of a hybrid vehicle in which only the electric motor is used as a drive force source, by driving the electric motor with electric power from the electric storage means while the rotational driving of the internal combustion engine has been stopped, comprising rotational drive means for determining whether or not supply of the lubrication oil to at least a portion of the power transmission means by the lubrication oil supply means is necessary based on a travel distance in the motor-powered travel following a stop of the rotational driving of the internal combustion engine, and for rotationally driving the internal combustion engine based on determination as to need for the supply of the lubrication oil, wherein the rotational drive means rotationally drives the internal combustion engine by starting the internal combustion engine.

18. A control device for a hybrid vehicle driving device that includes:
an internal combustion engine and an electric motor as drive force sources;
power transmission means for transmitting power of the drive force sources to a driving wheel;
electric storage means for supplying stored electric power to the electric motor; and
lubrication oil supply means operatively linked to the internal combustion engine for supplying lubrication oil to at least a portion of the power transmission means due to rotational driving of the internal combustion engine,
wherein the hybrid vehicle driving device is capable of causing a motor-powered travel of a hybrid vehicle in which only the electric motor is used as a drive force source, by driving the electric motor with electric power from the electric storage means while the rotational driving of the internal combustion engine has been stopped, comprising rotational drive portion means for determining whether or not supply of the lubrication oil to at least a portion of the power transmission means by the lubrication oil supply means is necessary based on an electric power amount stored in the electric storage means, and for rotationally driving the internal combustion engine based on determination as to need for the supply of the lubrication oil.

19. A control method for a hybrid vehicle driving device that includes:
an internal combustion engine and an electric motor as drive force sources;
a power transmission device that transmits power of the drive force sources to a driving wheel;
an electric storage device that supplies stored electric power to the electric motor; and
a lubrication oil supply device that is operatively linked to the internal combustion engine and that supplies lubrication oil to at least a portion of the power transmission device due to rotational driving of the internal combustion engine, wherein the hybrid vehicle driving device is capable of causing a motor-powered travel of a hybrid vehicle in which only the electric motor is used as a drive force source, by driving the electric motor with electric power from the electric storage device while the rotational driving of the internal combustion engine has been stopped, comprising:
detecting a travel distance in the motor-powered travel after the rotational driving of the internal combustion engine has been stopped;
determining whether or not supply of the lubrication oil to at least a portion of the power transmission device by the lubrication oil supply device is necessary based on the travel distance; and
rotationally driving the internal combustion engine based on determination as to need for the supply of the lubrication oil, wherein the internal combustion engine is rotationally driven by starting the internal combustion engine.

20. A control method for a hybrid vehicle driving device that includes:
an internal combustion engine and an electric motor as drive force sources;
a power transmission device that transmits power of the drive force sources to a driving wheel;

an electric storage device that supplies stored electric power to the electric motor; and a lubrication oil supply device that is operatively linked to the internal combustion engine and that supplies lubrication oil to at least a portion of the power transmission device due to rotational driving of the internal combustion engine, wherein the hybrid vehicle driving device is capable of causing a motor-powered travel of a hybrid vehicle in which only the electric motor is used as a drive force source, by driving the electric motor with electric power from the electric storage device while the rotational driving of the internal combustion engine has been stopped, comprising:

detecting an electric power amount stored in the electric storage device;

determining whether or not supply of the lubrication oil to at least a portion of the power transmission device by the lubrication oil supply device is necessary based on the electric power amount; and rotationally driving the internal combustion engine based on determination as to need for the supply of the lubrication oil.

21. A control device for a hybrid vehicle driving device that includes:

an internal combustion engine and an electric motor as drive force sources;

power transmission means for transmitting power of the drive force sources to a driving wheel;

electric storage means for supplying stored electric power to the electric motor;

lubrication oil supply means operatively linked to the internal combustion engine for supplying lubrication oil to at least a portion of the power transmission means due to rotational driving of the internal combustion engine;

wherein the hybrid vehicle driving device is capable of causing a motor-powered travel of a hybrid vehicle in which only the electric motor is used as a drive force source, by driving the electric motor with electric power from the electric storage means while the rotational driving of the internal combustion engine has been stopped, comprising rotational drive means for determining whether or not supply of the lubrication oil to at least a portion of the power transmission means by the lubrication oil supply means is necessary based on a travel distance in the motor-powered travel following a stop of the rotational driving of the internal combustion engine, and for rotationally driving the internal combustion engine based on determination as to need for the supply of the lubrication oil; and a vehicle travel initiation determination portion that detects whether a vehicle travel initiating operation has been performed in a hybrid vehicle, wherein the rotational drive means rotationally drives the internal combustion engine based on a result of detection of the vehicle travel initiation determination portion.

22. A control method for a hybrid vehicle driving device that includes:

an internal combustion engine and an electric motor as drive force sources;

a power transmission device that transmits power of the drive force sources to a driving wheel;

an electric storage device that supplies stored electric power to the electric motor; and a lubrication oil supply device that is operatively linked to the internal combustion engine and that supplies lubrication oil to at least a portion of the power transmission device due to rotational driving of the internal combustion engine, wherein the hybrid vehicle driving device is capable of causing a motor-powered travel of a hybrid vehicle in which only the electric motor is used as a drive force source, by driving the electric motor with electric power from the electric storage device while the rotational driving of the internal combustion engine has been stopped, comprising:

detecting a travel distance in the motor-powered travel after the rotational driving of the internal combustion engine has been stopped;

determining whether or not supply of the lubrication oil to at least a portion of the power transmission device by the lubrication oil supply device is necessary based on the travel distance;

rotationally driving the internal combustion engine based on determination as to need for the supply of the lubrication oil; and detecting, by a vehicle travel initiation determination portion, whether a vehicle travel initiating operation has been performed in a hybrid vehicle, wherein the internal combustion engine is driven based on a result of detection of the vehicle travel initiation determination portion.

* * * * *